United States Patent
Nakata et al.

(10) Patent No.: US 7,842,904 B2
(45) Date of Patent: Nov. 30, 2010

(54) WELDING SYSTEM AND CONSUMABLE ELECTRODE WELDING METHOD

(75) Inventors: Hiroyuki Nakata, Osaka (JP); Yasushi Mukai, Osaka (JP); Tatsuya Ikeda, Hyogo (JP); Naoto Masunaga, Hyogo (JP); Masaru Kowa, Hyogo (JP); Yasuyoshi Honuchi, Hyogo (JP)

(73) Assignee: Panasonic Corporation, Osaka (JP)

( * ) Notice: Subject to any disclaimer, the term of this patent is extended or adjusted under 35 U.S.C. 154(b) by 740 days.

(21) Appl. No.: 10/582,563

(22) PCT Filed: Oct. 18, 2005

(86) PCT No.: PCT/JP2005/019119

§ 371 (c)(1),
(2), (4) Date: Jun. 12, 2006

(87) PCT Pub. No.: WO2006/043550

PCT Pub. Date: Apr. 27, 2006

(65) Prior Publication Data

US 2007/0119841 A1   May 31, 2007

(30) Foreign Application Priority Data

Oct. 21, 2004  (JP)  ............... 2004-306672
Oct. 21, 2004  (JP)  ............... 2004-306673

(51) Int. Cl.
*B23K 9/10*  (2006.01)
*B23K 9/06*  (2006.01)

(52) U.S. Cl. .................. 219/137.71; 219/124.01

(58) Field of Classification Search ............ 219/137.71, 219/132, 121.56, 121.28, 121.13, 124.1, 219/124.4, 136; 318/568.22; 901/42

See application file for complete search history.

(56) References Cited

U.S. PATENT DOCUMENTS

| 4,076,131 | A | * | 2/1978 | Dahlstrom et al. | .......... 414/730 |
| 4,445,022 | A | * | 4/1984 | Mori | .......... 219/125.1 |
| 4,538,047 | A | * | 8/1985 | Nakano et al. | .......... 219/125.1 |
| 5,412,175 | A | * | 5/1995 | Shimogama | .......... 219/125.1 |

(Continued)

FOREIGN PATENT DOCUMENTS

JP   01177604   7/1989

(Continued)

OTHER PUBLICATIONS

Japanese Office action with English translation dated Mar. 10, 2008.

(Continued)

*Primary Examiner*—Tu B Hoang
*Assistant Examiner*—Hung Nguyen
(74) *Attorney, Agent, or Firm*—Pearne & Gordon LLP

(57) ABSTRACT

A torch is moved by a manipulator in a direction separating from a base material 7 while a wire is supplied, whereby an actuator driving the robot manipulator can control a velocity of the wire for a workpiece by a unidirectional operation of separating the torch, and vibration due to reverse of torch velocity is not generated. Further, by using a dedicated separation control system, velocity follow-up performance of the actuator moving the torch can be heightened without increasing overshoot in the usual operation time, and the acceleration and deceleration time of the manipulator can be reduced.

18 Claims, 19 Drawing Sheets

U.S. PATENT DOCUMENTS

| | | | |
|---|---|---|---|
| 6,298,283 B1 * | 10/2001 | Kato et al. | 700/255 |
| 2003/0000931 A1 | 1/2003 | Ueda et al. | |

FOREIGN PATENT DOCUMENTS

| JP | 11070490 A * | 3/1999 |
|---|---|---|
| JP | 11282540 A * | 10/1999 |
| JP | 2002-178146 | 6/2002 |
| JP | 2002-205169 | 7/2002 |
| JP | 2002205169 A * | 7/2002 |
| JP | 2003-311405 | 11/2003 |
| WO | 00/35622 A1 | 6/2000 |

OTHER PUBLICATIONS

European Search Report.

* cited by examiner

NO FF CONTROL (KFF = 0)

KFF = 0.5

KFF = 1.0

NO FF CONTROL (KFF = 0)

KFF = 0.5

KFF = 1.0

WELDING SYSTEM AND CONSUMABLE ELECTRODE WELDING METHOD

TECHNICAL FIELD

The present invention relates to a control method of controlling a position of a welding robot driven by a motor

BACKGROUND ART

Recently, in the industry of welding, more effort into improvement of productivity is continued every day. Particularly, requests to reduce a short-time stop of a production line caused by minor troubles and to reduce a tact time become higher than before.

Various factors are thought as causes of the stop of the production line. The largest cause is a trouble caused by poor arc start.

Therefore, in the arc start in a conventional consumable electrode type welding process, when a start signal is input from the exterior part, a robot manipulator is driven to move a welding torch to a weld-start-position which has been previously taught. Thereafter, in a state where feeding of a wire is stopped, the welding torch is moved by the robot manipulator nearly in the feeding direction of the welding wire and a leading end of the wire is gradually brought close to a workpiece. When it is judged that the wire leading end has come into contact with the workpiece, an initial current of a predetermined small current value is applied by a welding power supply unit. Simultaneously, the welding torch is moved in the opposite direction to the feeding direction of the welding wire thereby to perform a retreat movement in which the wire leading end is kept away from the workpiece. When the wire leading end is separated from the workpiece by the retreat movement, an arc to which the initial current connects is generated. In a state where the initial arc generating state is kept, the retreat movement is continued thereby to return the welding torch to the weld-start-position. Thereafter, the retreat movement is switched to movement in the welding direction which has been previously taught, and simultaneously the feeding of the welding wire is started and a steady welding current is applied, whereby the initial arc generating state is shifted to the steady arc generating state (refer to, for example, Patent Document 1).

FIG. 4 is a whole block schematic diagram of a welding system by means of a robot that uses the above consumable electrode type welding process.

In FIG. 4, a welding wire 101 that is a consumable electrode is drawn out from a wire spool 102 in the direction of a welding torch 104 by a wire feeding motor 103.

A welding power supply unit 105 applies the predetermine welding current I and welding voltage V between the welding wire 101 and a base material 107 that is a workpiece through the welding torch 104 and a welding tip 106, thereby to generate an arc 108 and control the wire feeding motor 103.

A robot manipulator 109 holds the welding torch 104, locates the welding torch 104 at a weld start position (not shown), and moves the welding torch 104 along a weld line (not shown).

A robot controller 110 performs bilateral communication S with the welding power supply unit 105, and transmits welding conditions such as the welding current I and the welding voltage V, and weld start and end commands, thereby to control the robot manipulator 109.

A consumable electrode type welding process in the thus constructed welding system will be described with reference to a time chart of FIG. 5.

In FIG. 5, a vertical axis represents each condition of a traveling velocity TV of the welding torch, a feeding velocity WF of the welding wire, a short-circuit judgment signal A/S, a welding current I, and a welding voltage V; and a horizontal axis represents time. A point of time when a weld start signal has transmitted from the robot controller 110 to the welding power supply unit 105 is denoted by TS0', and TS1' to TS5' after the TS0' will be described later.

Firstly, the robot controller 110 transmits a weld start signal to the welding power supply unit 105, actuates the robot manipulator 109, and causes the welding torch 104 to accelerate toward the base material 107. When the velocity of the welding torch 104 comes to an initial torch velocity TV0, the acceleration of the robot manipulator 109 is stopped, so that descent of the welding torch 104 continues at a constant velocity.

Further, upon reception of the weld start signal from the robot controller 110, the weld power supply unit 105 applies a no load voltage V0 between the welding wire 101 and the base material 107.

When the welding wire 101 and the base material 107 contacts each other at the time TS1', a short-circuit judgment signal A/S is outputted from a short-circuit judging unit (not shown) provided in the welding power supply unit 105.

When this short-circuit judgment signal A/S is transmitted to the robot controller 110 through the bilateral communication S, the robot controller 110 decelerates and stops immediately the robot manipulator 109. At the time TS2', the operation of the robot manipulator 109, that is, the velocity of the welding torch 104 comes to zero.

Thereafter, the robot controller 110 reverses the operation of the robot manipulator 109 immediately, whereby the welding torch 104 starts an operation in a direction separating from the base material 107 to perform a pull-up operation of the welding torch 104.

An interval between the time TS1' and the time TS3' is an initial short-circuit period. From the TS1' to the time TS2' when the robot manipulator 109 decelerates and the velocity of the welding torch 104 comes to zero, the robot manipulator 109 presses the wire 101 against the base material 107. From the time TS2' and on, the operation of the robot manipulator 109 is reversed, so that the pressing amount of the wire 101 decreases gradually, and at a point of the time TS3', the short-circuit is released.

The time TS3' when this short-circuit is released occurs when the area of a triangle cde that is formed by a line TV representing the velocity of the welding torch 104 and represents the pull-up amount of the welding wire 101 is greater than the area of a triangle abc that represents the pressing amount of the welding wire 101.

Further, the welding power supply unit 105, when the initial short-circuit occurs at the time TS1', controls the welding current I at a welding current I1'. A predetermined time later, the welding power supply unit 105 increases the welding current I1' to a current I2', and waits for short-circuit release.

The reason why the welding current is controlled at I1' that is set comparatively low in a first stage in this initial short-circuit period is that: it is prevented that the welding wire 101 melted by the Joule heat of the leading end portion of the welding wire 101 generated due to the initial short-circuit scatters simultaneously with generation of the arc thereby to become spatter.

Further, the reason why the current I1' is changed to the current I2' is to given energy enough to generate an arc at the short-circuit release time of the time TS3'.

When the arc is generated at the time TS3', the welding power supply unit 105 starts the wire feeding motor 103 and accelerates the welding wire 101 toward the base material 107. The acceleration is continued till the velocity of the welding wire 101 comes to a welding wire velocity for regular welding. After the velocity of the welding wire 101 has come to the welding wire velocity for regular welding, the feeding of the welding wire 101 is continued at a constant velocity.

Further, the welding power supply unit 105 controls the arc current I at an arc initial current I3' for a fixed time in synchronization with starting of the wire feeding motor 103, and thereafter controls the arc current I at a second initial current I4. Thereafter, the welding power supply unit 105 controls the arc current I at regular welding output (not shown).

Patent Document 1: JP-A-2002-205169

DISCLOSURE OF THE INVENTION

However, the conventional consumable electrode type welding process requires the reverse operation of the robot manipulator 109. Namely, as it is judged that the leading end of the welding wire 101 has come into contact with the base material 107, the deceleration of the robot manipulator 109 moving forward is started. After the deceleration has been stopped once, the robot manipulator 109 is reversed and accelerated in the retreat direction. Therefore, a response time and an acceleration and deceleration time of the robot manipulator 109 are required.

The robot manipulator 109 is generally driven by a motor through a reduction gear. Therefore, when the velocity of the robot manipulator 109 is reversed at the time TS2', vibration is generated due to backlash (play in engagement) of the reduction gear, spring component, discontinuity of friction, and the like.

Therefore, the welding wire 101 can be excessively pressed against the base material 107 by this vibration, so that there is fear that the welding wire 101 will buckle.

Further, also in case that responsibility of the robot manipulator 109 is bad and delay is produced between a velocity command for the welding torch 104 and the actual velocity thereof, time since the short-circuit is detected at the time TS1' till the velocity is reduced and reversed at the time TS2' is prolonged. In result, the welding wire 101 can be excessively pressed against the base material 107, so that there is fear that the welding wire 101 will buckle.

Here, the responsibility of the robot manipulator 109 is determined by a position control loop constituted in the robot controller 110. FIG. 6 shows the constitution of the position control loop.

In FIG. 6, when the welding torch 104 is caused to operate on the desired locus, a locus of a motor position of each shaft constituting the robot manipulator 109 is found by an inverse kinetic calculation, and its velocity component is input, as a velocity loop command TVC 201, to the control loop.

The reason why not a position component but the velocity component is input to the control loop is that the position component requires great significant digit including all of the operation range of the robot thereby to increase load on data processing.

A torch position command TPC 203 obtained by integrating this torch velocity command TVC 201 by an integration element 202.

In case that the locus is taught the robot manipulator 109, it is general to appoint positions of a start point and an end point. The reason why the position loop 216 is required is that positioning cannot be carried out exactly by only a velocity loop 218.

Therefore, in general feedback control (hereinafter indicated as FB control), a difference between the torch position command TPC 203 and a torch position feedback (hereinafter indicated as FB) signal TPF 204 outputted from a rotational position sensor 215 provided for a motor 214 is multiplied by a position loop gain KPP 205 thereby to generate a velocity loop command TVCA 200, and the velocity loop command TVCA 200 is input to the velocity control loop 218.

$$TVCA = KPP \times (TPC - TPF)$$ [Numerical Expression 1]

The velocity control block 218 generates a current command TCC 212 from a difference between the velocity loop command TVCA 200 and a torch velocity FB signal TVF 208 obtained by differentiating a torch position FB signal TPF 204, a velocity loop proportional gain KPS 209, an integration element 210, and a velocity loop integration gain KIS 211. A current amplifier 213 which has received this current command TCC 212 applies actual current to the motor 214, thereby to drive the manipulator 109.

In this state, generally, the velocity loop command TVCA 200 calculated by this position loop 216 becomes a signal which is delayed in phase from the torch velocity command TVC 201 that is the velocity component of the motor position command TPC 203. This point becomes a main reason why the torch velocity FB signal TVF 208 cannot follow the torch velocity command TVC 201 sufficiently, and the phase is delayed. FIG. 7(a) shows this phase delay.

FIG. 7a shows an example of the torch velocity command TVC 201, in which acceleration, constant speed, and deceleration are given in the shape of a general trapezoid. The torch velocity FB signal TVF 208 cannot follow the torch velocity command TVC 201 sufficiently, the phase of the signal TVF 208 is delayed, and a maximum error of 35.3% is generated at maximum velocity ratio.

Therefore, as a method generally used in order to increase responsibility of the robot manipulator 109, there is a method in which a feedforward control (hereinafter indicated as FF control) shown in FIG. 9 is added.

In FIG. 9, an FF control block 217 is added into the position control loop 216 in the control block in FIG. 6 thereby to make the velocity loop command into TVCB 206. The FF control block 217 multiplies the torch velocity command TVC 201 by a velocity FF gain KFF 219 and adds its calculation result to the velocity loop command TVCA 200 obtained by the Numerical Expression 1.

$$TVCB = TVCA + KFF \times TVC$$ [Numerical Expression 2]

It has been known that velocity follow-up performance increases as described later by inputting the TVCB 206 calculated by the Numerical Expression 2 to a velocity control loop 218 as a velocity command.

A range of the velocity FF gain KFF 219 is as shown in the following Numerical Expression 3.

$$0 \leq KFF \leq 1.0$$ [Numerical Expression 3]

In FIG. 9, in case that KFF=0, the control command in FIG. 9 is equivalent to the control command in FIG. 6.

As the velocity FF gain KFF 219 increases, that is, as the velocity FF gain KFF 219 comes closer to 1, the velocity follow-up performance improves more, but overshoot increases. FIGS. 7(b) and 7(c) show this relation.

In FIG. 7(b), KFF=0.5; and in FIG. 7(c), KFF=1.0. As a torch velocity command TVC 201, the same waveform as that in FIG. 7(a) is given in FIGS. 7(b) and 7(c).

In the usual operation of the manipulator 109, the waveform shape of the torch velocity command TVC 201 is predetermined by load parameter of the manipulator 109, the maximum number of rotations of the motor 214, and maximum torque. It is general that correction taking the follow-up delay into consideration is not performed in real time.

In FIGS. 8(a) to 8(c), the torch velocity plotted in a vertical axis in FIGS. 7(a) to 7(c) is changed to the torch position, in which an end position is taken as 100%. Herein, it is found that: similarly to the case of the velocity, as the velocity FF gain KFF 219 is increased and comes closer to 1, overshoot in position increases.

The increase of the overshoot in position causes the following problems.

After completion of welding, generally, the robot manipulator 109 moves to a retreat position where taking-out of the base material 107 that has completed welding and setting of a new base material 107 are not impeded, sets a new base material 107, and thereafter moves the welding torch 104 to the position at the time TS0' which is a weld start point from which the welding torch 104 starts coming close to the base material 107. In this case, it is preferable that the leading end of the welding wire 101 stops without overshooting on the base material 107 side. In case that the leading end of the welding wire 101 overshoots, it comes into contact with the base material 7 in the unintentional time, so that possibilities of buckling of the welding wire 101 and spatter generation are produced.

Namely, it is found that: considering the movement from the retreat position to the weld start point TS0', in order to prevent the leading end of the welding wire 101 from coming into contact with the base material 7, the velocity FF gain KFF 219 relating to the overshoot on the base material 107 side cannot be made so great.

On the other hand, in an interval from TS0' to TS2' in the conventional arc start processing shown in FIG. 5, as described later, the deceleration position at the TS1' when the welding wire 101 comes into contact with the base material 107 cannot be previously taught.

Namely, the short-circuit position is not fixed due to the protruding amount of the welding wire 101 from the welding torch 104 and due to a shape error of the base material 107. Thereafter, after the short-circuit has been detected by the short-circuit judgment signal A/S, the deceleration is performed.

However, to give a brief description, on the assumption that there are no errors in the protruding amount of the welding wire 101 and in the shape of the base material 107, the following description is given.

FIG. 10(a) shows a case where the velocity FB signal TVF 208 has no follow-up delay between the TS0' and the TS2' in the conventional arc start processing and follows the torch velocity command TVC 201 completely. In FIG. 10(b), position components are plotted in the vertical axis.

In FIGS. 10(a) and 10(b), at the time TS1' (=0.4), the torch comes into contact with the base material 107, the short circuit is detected, and deceleration of the torch is started. At the time TS2' (=0.6), the torch is stopped.

In the vertical axis of FIG. 10(b), the moving amount to the time TS2' is taken as 100%, and at the time TS1' when the short-circuit arises, the moving amount is 75%.

However, actually, as shown in FIGS. 7(a) to 7(c), the follow-up delay in relation to the torch velocity command TVC 201 is generated in the velocity FB signal TVF 208. Therefore, the time when the velocity FB signal TVF 208 short-circuits, that is, the time TS1' when the moving amount in FIG. 10(b) comes to 75% is delayed.

FIG. 11(a) shows the relation between the torch velocity command TVC 201 and the velocity FB signal TVF 208 when KFF=0.

In FIG. 11(a), the torch velocity command TVC 201 accelerates to the time 0.2, and thereafter is output at a contact velocity. For this time, the errors due to the follow-up delay store in the velocity FB signal TVF 208, and even at the time 0.4 when the torch velocity command TVC 201 reaches the short-circuit position, the velocity FB signal TVF 208 has not reached the short-circuit position. Since the short-circuit is not generated, the torch velocity command TVC 201 does not decelerate and holds a constant value. Thereafter, at the time 0.47 (shown by TS1'), the velocity FB signal TVF 208 achieves the short-circuit position at length, and the torch velocity command TVC 201 turns to deceleration and decelerates up to zero.

However, thereafter, the follow-up delay is also generated, and the torch descends till the velocity FB signal TVF 208 decelerates to zero.

FIG. 12(a) is obtained by plotting the torch position in the vertical axis of FIG. 11(a). In the vertical axis of FIG. 12(a), the moving amount to the time TS2' in FIG. 10(b) in which the case of no follow-up delay is indicated is taken as 100%.

In FIG. 12(a), the overshoot of the position FB signal TPF 204 for the torch position command TPC 203 is small. However, by delay of the short-circuit time TS1' caused by the follow-up delay, the moving amount at the time TS2' is larger by 17.6% than the moving amount (100%) in FIG. 10(b). Namely, the descendingly moving amount becomes large, and the wire 101 thrusts into the base material 107 excessively. Therefore, possibility that the wire 101 will buckle is produced.

FIGS. 11(c) and FIG. 12(c) show waveforms when KFF=1.0.

In FIG. 11(c), the velocity overshoot is 13.3%, which is larger than the velocity overshoot when KFF=0. However, the follow-up delay is smaller, and the maximum error decreases to 13.3%.

FIG. 12(c) is obtained by plotting the torch position in the vertical axis of FIG. 11(a). In the vertical axis of FIG. 12(a), the moving amount to the time TS2' in FIG. 10(b) in which the case of no follow-up delay is indicated is taken as 100%.

In FIG. 12(c), the overshoot of the position FB signal TPF 204 for the torch position command TPC 203 is larger than the overshoot when KFF=0. However, since the follow-up delay is smaller, the short-circuit time TS1' is hardly delayed. The overshoot of the moving amount at the time TS2' for the moving amount (100%) in FIG. 10(b) decreases to 3.1%.

From the above result, it is known that: between the TS0' and the TS2' in the conventional arc start processing, since the deceleration starts after the detection of short-circuit at the TS1', when the follow-up delay is smaller ever if the velocity overshoot is large, that is, when KFF is set at 1.0, the moving amount after the short-circuit detection at the TS1' can be made smaller; and risky possibility of buckling of the welding wire 101 is reduced.

However, in case that KFF=1 in order to put stress on the velocity follow-up performance necessary for the time from the TS0' that is the weld start point, the overshoot amount in the moving operation from the retreat position to the weld start point TS0' increases. In result, the leading end of the welding wire 101 comes into contact with the base material 107 at the unintentional point of time, and possibilities of buckling of the welding wire 101 and generation of spatter are produced. Therefore, it is difficult to adjust the FF gain KFF so that both of improvement of the velocity follow-up performance and suppression of the overshoot are satisfied.

As described above, in the conventional method, because of the vibration in the direction reversing time and the follow-up delay, the welding wire 101 can be pressed against the base material 107 excessively. Therefore, the torch acceleration and deceleration between the TS0' and the TS4' must be decreased, so that there is a large possibility that the useless time in arc generation sequence becomes long.

An object of the invention is to provide a consumable electrode type welding process which can reduce the useless time in arc generation sequence which the conventional consumable electrode type welding process has included, without generating buckling and spatter of a welding wire.

In order to achieve the above object, a welding system of the invention includes a wire feeding unit which feeds a welding wire to a welding torch, an actuator which holds the welding torch and moves the welding torch, a controller which has a position control system and drive-controls the actuator, and a welding power supply unit which applies weld output between an workpiece and the welding wire. Herein, the welding torch is moved by the actuator in a direction separating from the workpiece thereby to control the velocity of the welding wire for the workpiece. The controller includes, separately from the position control system, a dedicated separation control system which moves the actuator in the direction where the welding torch is separated from the workpiece.

Further, a consumable electrode type welding process of the invention, using a welding system including a wire feeding unit which supplies a welding wire to a welding torch, an actuator which holds the welding torch and moves the welding torch, a controller which has a position control system and controls the actuator, and a welding power supply unit which applies weld output between an workpiece and the welding wire, moves the welding torch by the actuator in a direction separating from the workpiece while the welding wire is being supplied, thereby to control the velocity of the welding wire for the workpiece. Herein, the process is characterized in that the controller includes, separately from the position control system, a dedicated separation control system for controlling the actuator in the direction where the welding torch is separated from the workpiece.

According to this process, in the weld starting time, by the unidirectional operation by which the actuator separates the torch, the velocity of the welding wire for the workpiece can be controlled. Therefore, vibration due to reversal of the torch velocity is not generated. Further, the velocity follow-up performance of the actuator which moves the welding torch is increased by means of the dedicated separation control system, whereby the response time and the acceleration and deceleration time can be reduced compared with those in the conventional process. Further, the control by the dedicated separation control system is not performed in usual positioning, thereby to prevent generation of overshoot due to the separation control system.

As described above, in the invention, the welding torch is moved in the direction separating from the workpiece by the actuator controlled by means of the dedicated separation control system in the weld starting time. Hereby, it is possible to reduce the useless time in arc generation sequence which the conventional consumable electrode welding method has included, thereby to reduce tact time, or prevent buckling of the welding wire at the weld starting end portion and spatter generation, thereby to reduce so-called "minor downtimes" effectively.

BRIEF DESCRIPTION OF THE DRAWINGS

FIG. 7(*b*) is a graph showing the relation between a torch velocity command and feedback when the feedforward gain is 0.5 in the usual operation.

FIG. 7(*c*) is a graph showing the relation between a torch velocity command and feedback when the feedforward gain is 1 in the usual operation.

FIG. 8(*b*) is a graph showing the relation between a torch position command and feedback when the feedforward gain is 0.5 in the usual operation.

FIG. 8(*c*) is a graph showing the relation between a torch position command and feedback when the feedforward gain is 1 in the usual operation.

FIG. 10(*b*) is a graph showing the relation between a torch velocity command and feedback in case that there is no follow-up delay in the torch pull-up operation, in which the relation is represented by time and a torch position.

FIG. 11(*b*) is a graph showing the relation between a torch velocity command and feedback in the torch pull-up operation when feedforward gain is 0.5, in which the relation is represented by time and torch velocity.

FIG. 11(*c*) is a graph showing the relation between a torch velocity command and feedback in the torch pull-up operation when feedforward gain is 1, in which the relation is represented by time and torch velocity.

FIG. 12(*b*) is a graph showing the relation between a torch velocity command and feedback in the torch pull-up operation when feedforward gain is 0.5, in which the relation is represented by time and a torch position.

FIG. 12(*c*) is a graph showing the relation between a torch velocity command and feedback in the torch pull-up operation when feedforward gain is 1, in which the relation is represented by time and a torch position.

DESCRIPTION OF REFERENCE NUMERALS

Figure 1:
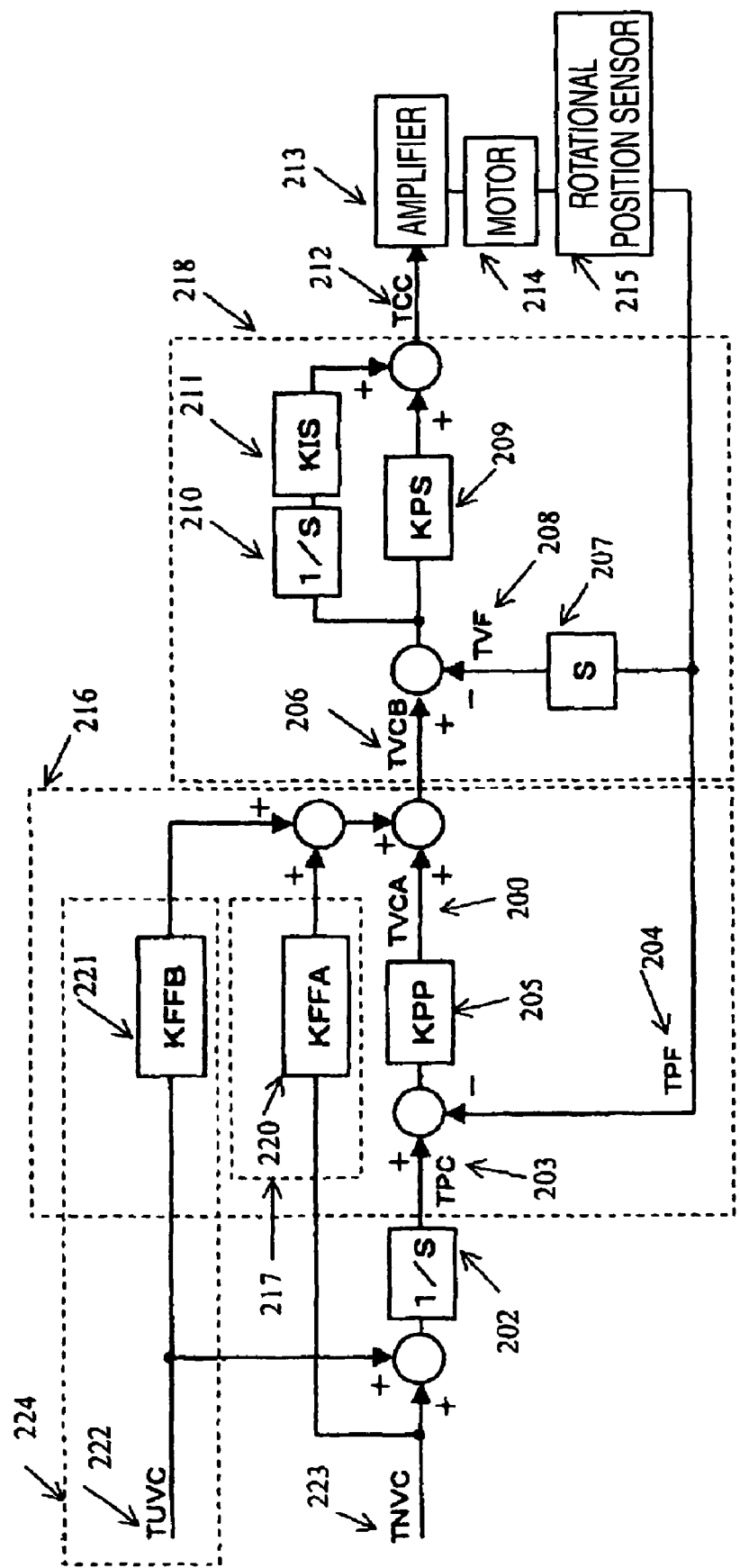
FIG. 1 is a block diagram showing a position control loop in an embodiment of the invention.

1 Welding wire
3 Wire feeding motor
4 Welding torch
5 Welding power supply unit
7 Base material
8 Arc
9 Robot manipulator
10 Robot controller
200 Velocity loop command TVCA
201 Torch velocity command TVC
202 Integral element
203 Torch position command TPC
204 Derivative element
205 Position loop gain KPP
206 Velocity loop command TVCB
207 Derivative element
208 Torch velocity FB signal TVF
209 Velocity loop proportional gain KPS
210 Integral element
211 Velocity loop integral gain KIS
212 Current command TCC
213 Current amplifier
214 Motor
215 Rotational position sensor
216 Position control loop
217 FF control block
218 velocity loop
219 Velocity FF gain KFF
220 Velocity FF gain KFFA
221 Velocity FF gain KFFB
222 Torch pull-up velocity command TUVC
223 Usual operation velocity command TNVC
224 Torch separation control block

BEST MODE FOR CARRYING OUT THE INVENTION

Embodiment 1

One embodiment of the invention will be described below with reference to FIGS. 1 to 3 and FIGS. 7 and 8.

Figure 2:
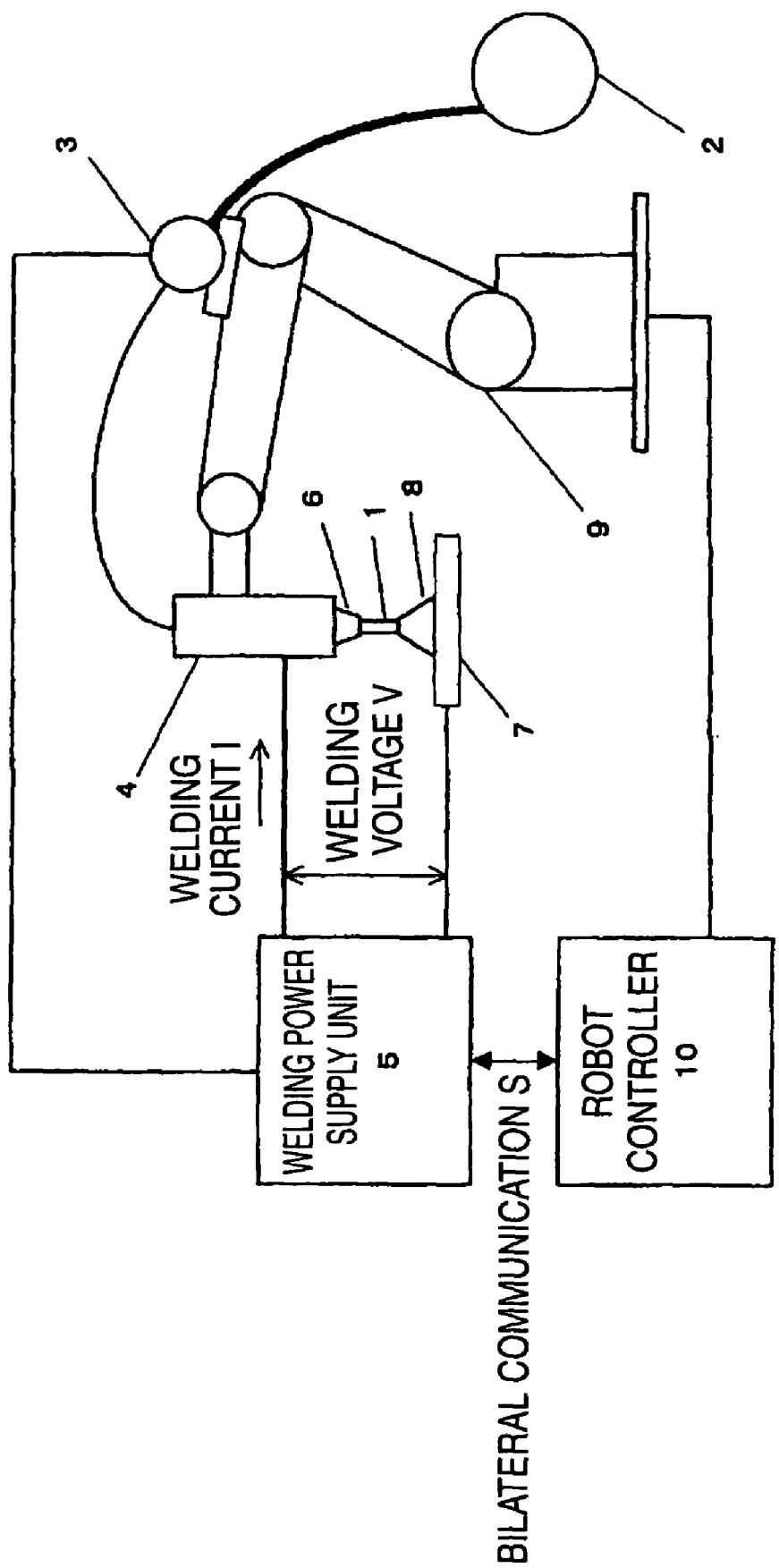
FIG. 2 is a block schematic diagram of a welding system used in the embodiment of the invention.
Figure 3:
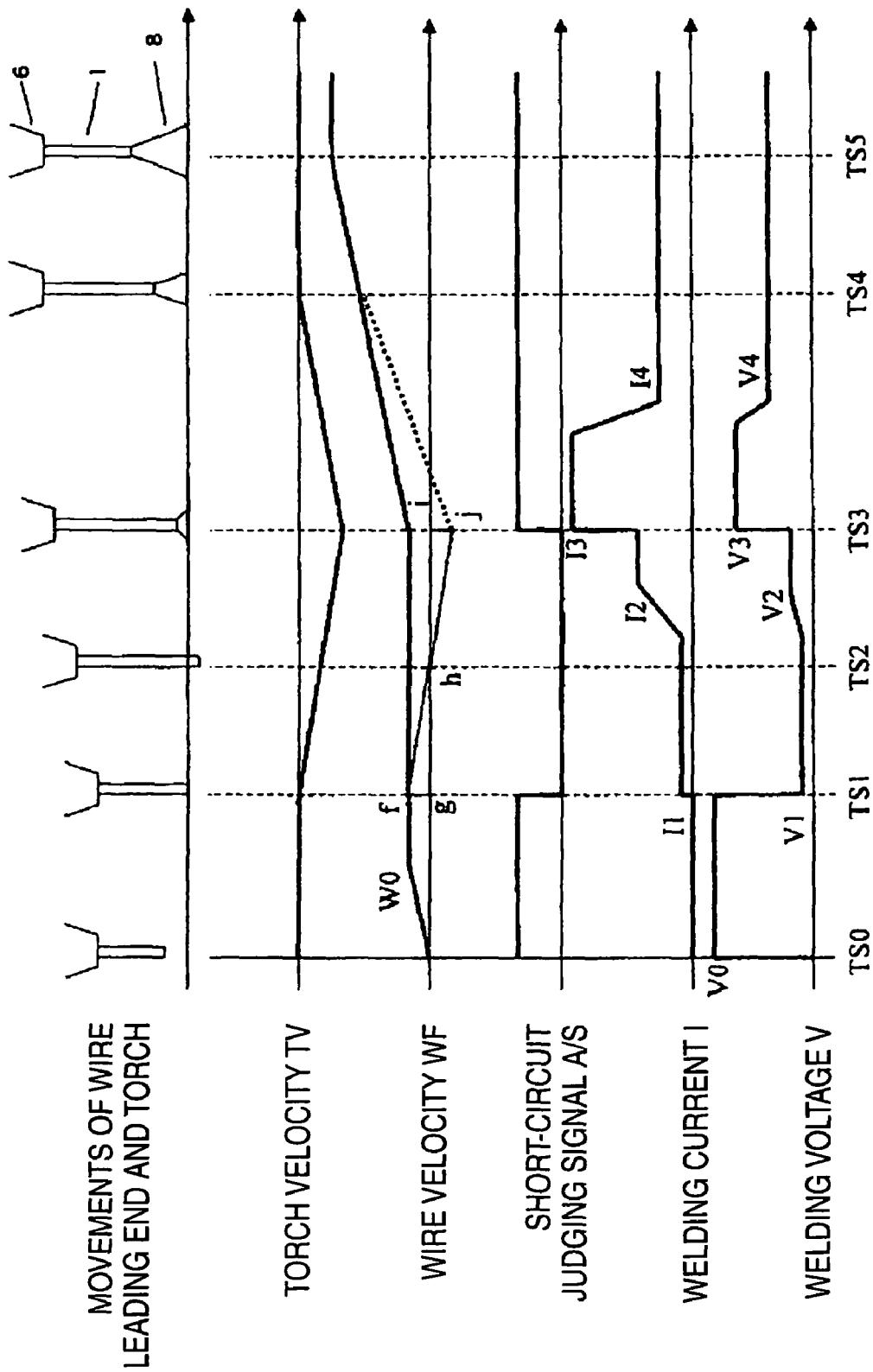
FIG. 3 is a timing chart in arc start time in the embodiment of the invention.
Figure 4:
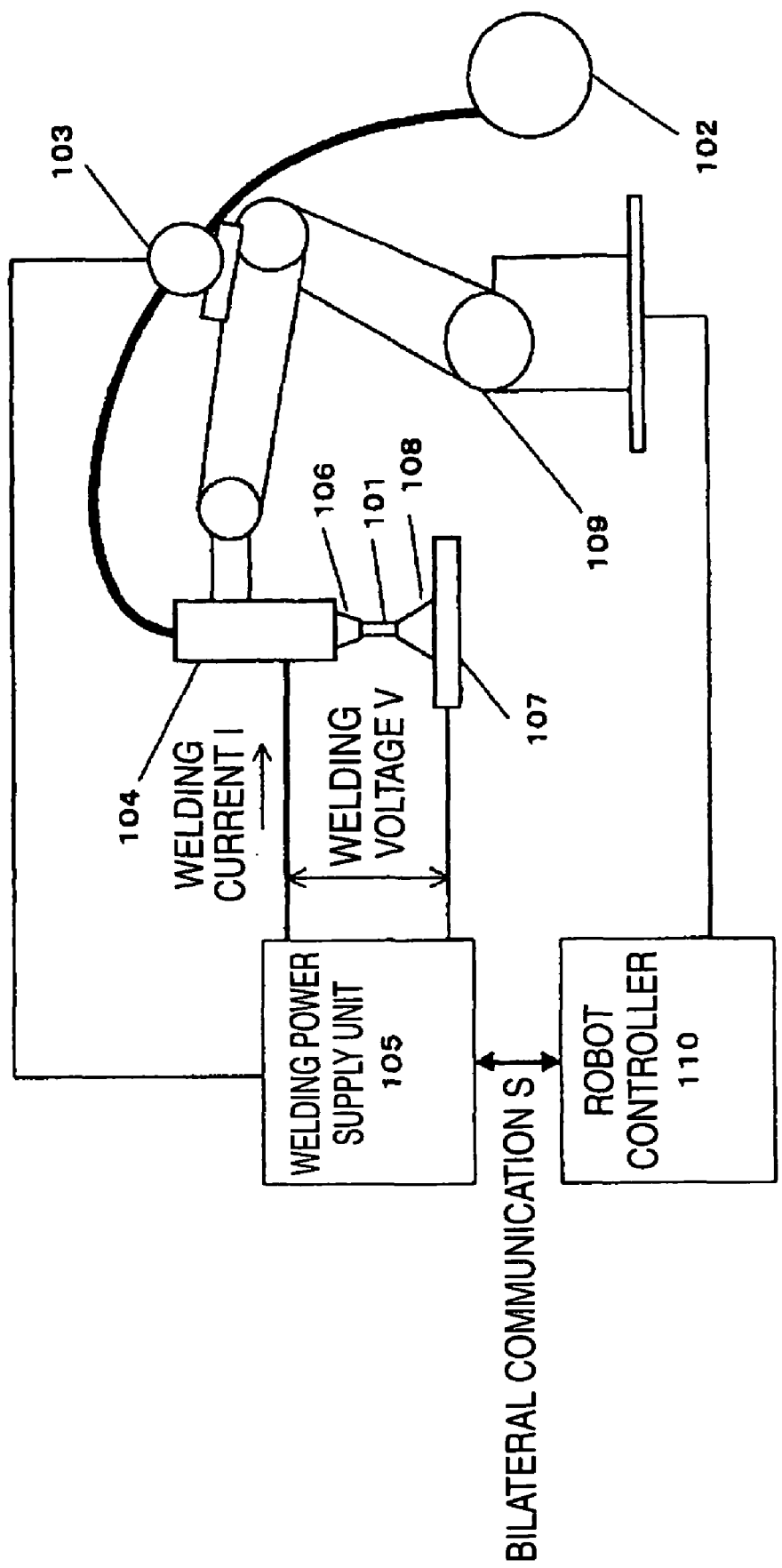
FIG. 4 is a block schematic diagram of a welding system used in the related art.
Figure 7:
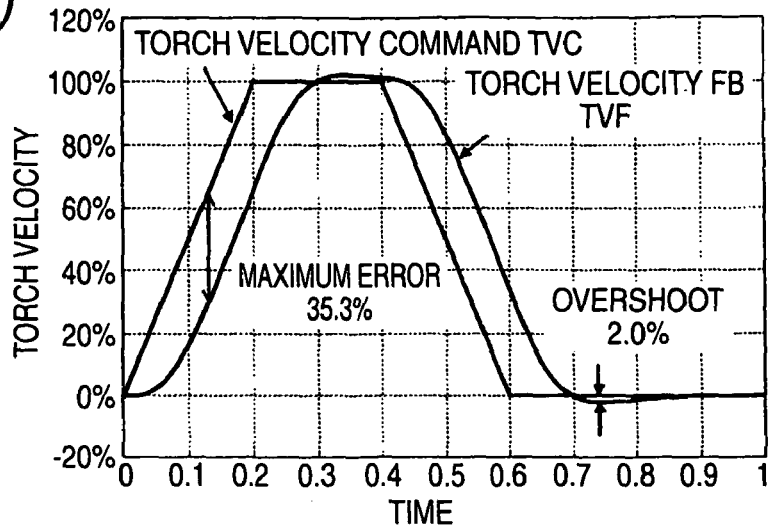
FIG. 7(*a*) is a graph showing the relation between a torch velocity command and feedback when feedforward gain is zero in the usual operation.
Figure 7:
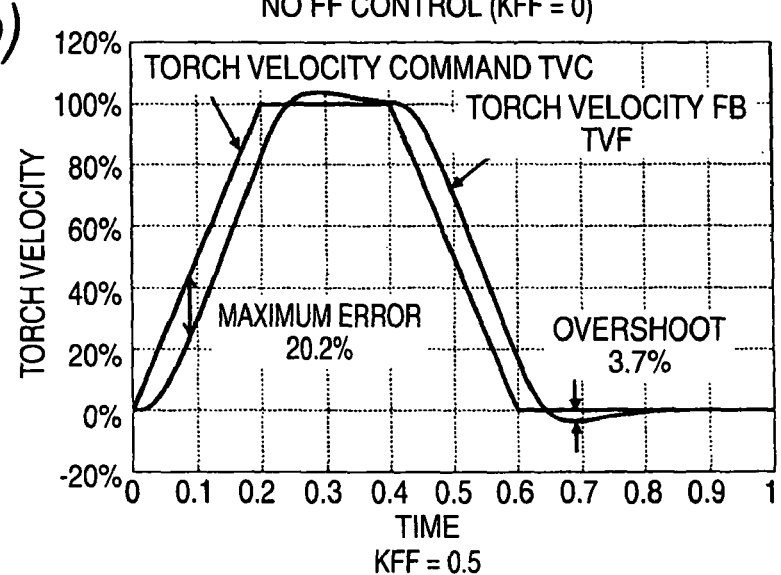
Figure 7:
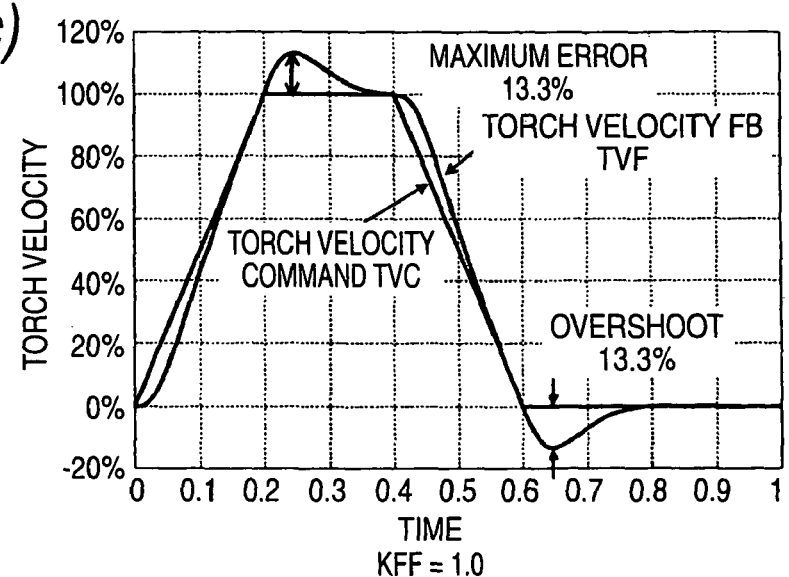
Figure 8:
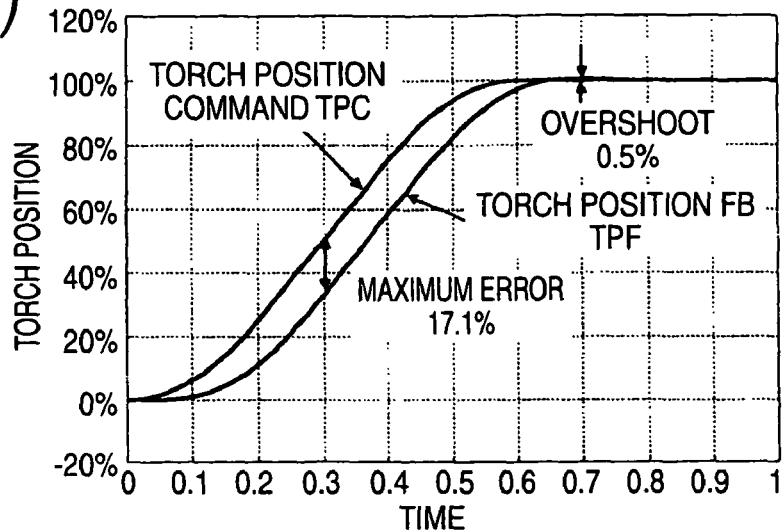
FIG. 8(*a*) is a graph showing the relation between a torch position command and feedback when feedforward gain is zero in the usual operation.
Figure 8:
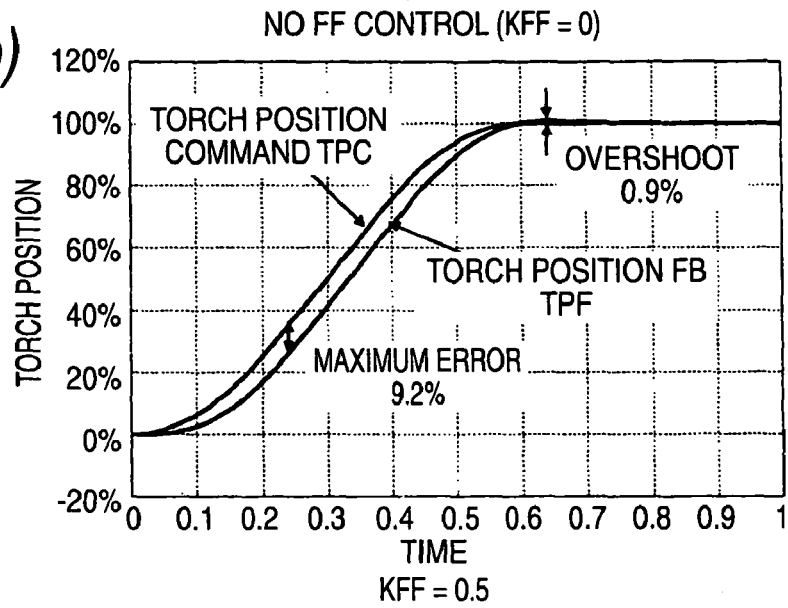
Figure 8:
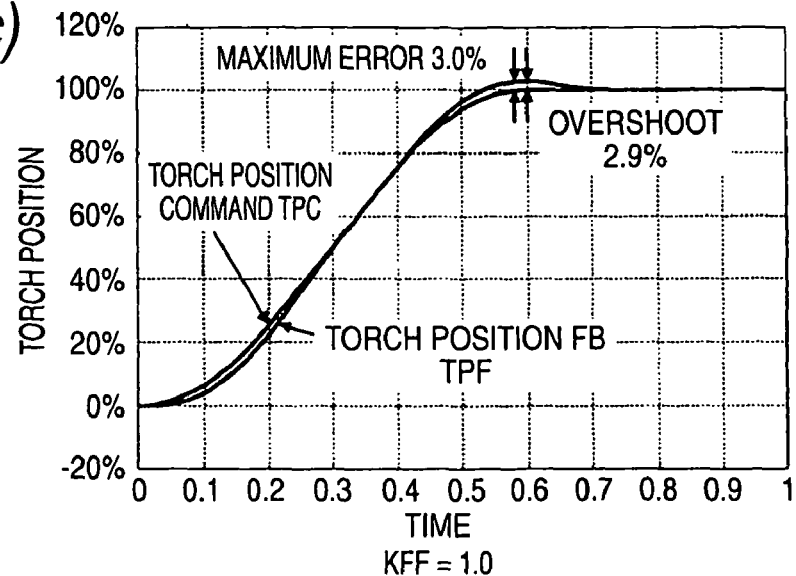

Referring first to FIGS. 2 and 3, construction of a welding system in this embodiment and a process of arc start will be described. Referring next to FIGS. 1, 7 and 8, a position control loop of a robot controller 10 in the embodiment will be described.

FIG. 2 is a constitutional diagram showing an outline of a welding system in the embodiment. A welding wire 1 that is a consumable electrode is supplied from a wire spool 2 in a direction of a welding torch 4 by a wire feeding motor 3.

A welding power supply unit 5 applies the predetermined welding current I and welding voltage V between the welding wire 1 and a base material 7 that is a workpiece through the welding torch 4 and a welding tip 6 thereby to generate an arc 8, and controls the wire feeding motor 3 to perform welding.

A robot manipulator 9, holding the welding torch 4, locates it in a weld start position (not shown), and moves the welding torch 4 along a welding line (not shown).

This robot controller 10 performs bilateral communication S with the welding power supply unit 5, and transmits welding conditions such as the welding current I and the welding voltage V, and a weld start or end command, thereby to control the robot manipulator 9.

In FIG. 3, a vertical axis represents each condition of a traveling velocity TV of the welding torch 4, a feeding velocity WF of the welding wire 1, a short-circuit judgment signal A/S, a welding current I, and a welding voltage V; and a horizontal axis represents time. The time T when a weld start signal has been transmitted from the robot controller 10 to the welding power supply unit 5 is denoted by TS0, and TS1 to TS5 after the TS0 represent later-described timing. At the time TS0, the welding torch 4 is located in the weld start position. Further, the TS1 indicates the time when the welding wire 1 and the base material 7 contact, the TS2 indicates the time when power applied to press the welding wire 1 on the base material 7 comes to zero, that is, the time when a pull-up velocity of the welding torch 4 and a feeding velocity of the welding wire 1 are matched with each other, the TS3 indicates the time when the short-circuit between the welding wire 1 and the base material 7 is released, the TS 4 indicates the time when the position in height of the welding torch 4 comes to the predetermined level and pull-up of the welding torch 4 is completed, and the TS5 indicates the time when a velocity WF of the wire comes to the predetermined velocity.

In FIG. 3, in the embodiment, when a welding start signal is transmitted from the robot controller 10 to the welding power supply unit 5 (TS0), the welding power supply unit 5 applies a no-load voltage V0 between the welding wire 1 and the base material 7 and actuates the wire feeding motor 3 thereby to accelerate the welding wire 1 toward the base material 7.

When the feeding velocity of the welding wire 1 comes to an initial wire velocity W0, the acceleration of the wire feeding motor 3 is stopped and the wire feeding is continued at a constant velocity.

At the time TS1, when the welding wire 1 and the base material 7 contacts each other, a short-circuit judgment signal A/S is outputted from a short-circuit judging unit (not shown) provided in the welding power supply unit 5.

This short-circuit judging signal A/S is transmitted to the robot controller 10 by the bilateral communication S, and the robot controller 10 causes immediately the robot manipulator 9 to start an operation in a direction where the welding torch 4 nearly separates from the base material 7, thereby to perform a pull-up operation of the welding torch 4.

An interval from the TS1 to the TS3 is an initial short-circuit period. For this period, feeding of the welding wire 1 is continued at the initial wire velocity W0, and the robot manipulator 9 continues the pull-up operation of the welding torch 4. Therefore, the velocity of a leading end portion of the welding wire 1 comes to a resultant velocity of the wire velocity WF and the torch velocity TV as shown by a dashed line in FIG. 3.

Therefore, the leading end of the welding wire 1 from the time TS1 on is being pressed on the base material 7 to the TS2 when the resultant velocity shown by the dashed line in FIG. 3 comes to zero. However, from the time TS2 on, the resultant velocity changes to a negative velocity, so that the pressing amount decreases, and the short circuit is released soon at the time TS3. At the time TS 3, the area of a triangle hji that indicates the pull-up amount of the welding wire 1 is greater than the area of a triangle fgh that indicates the pressing amount of the welding wire 1.

Further, the welding power supply unit 5, when the initial short-circuit is generated at the time TS1', controls the welding current I at a welding current I1. A predetermined time later, the welding power supply unit 5 increases the welding current I1' to a current I2', and waits for short-circuit release.

The reason why the welding current I is controlled at I1 that is set comparatively low in a first stage of the initial short-circuit period is that: it is prevented that the welding wire 1 melted by the Joule heat of the leading end portion of the welding wire 1 generated due to the initial short-circuit scatters simultaneously with arc generation thereby to become spatter.

Further, the reason why the current I' is changed to the current I2 is to given energy enough to generate an arc at the short-circuit release time of the time TS3.

In the pull-up operation of the welding torch 4 after the short-circuit detection at the TS1, in case that follow-up delay has been produced in the velocity TV of the welding torch 4, and it has taken the extra time for the pull-up velocity TV of the welding torch 4 to exceed the velocity WF of the welding wire 1, that is, it has taken the extra time for the resultant velocity to change to the negative velocity, feeding of the welding wire 1 is continued for this time, so that the pressing amount of the welding wire 1 becomes excessive, and there is possibility that the welding wire 1 will buckle.

Further, the short circuit detecting time of the TS1 cannot be taught in advance as well as the deceleration position at the TS1' is not known in advance in the related art as described before. Therefore, it is not possible to perform the pull-up operation in advance in anticipation of the follow-up delay.

Figure 5:
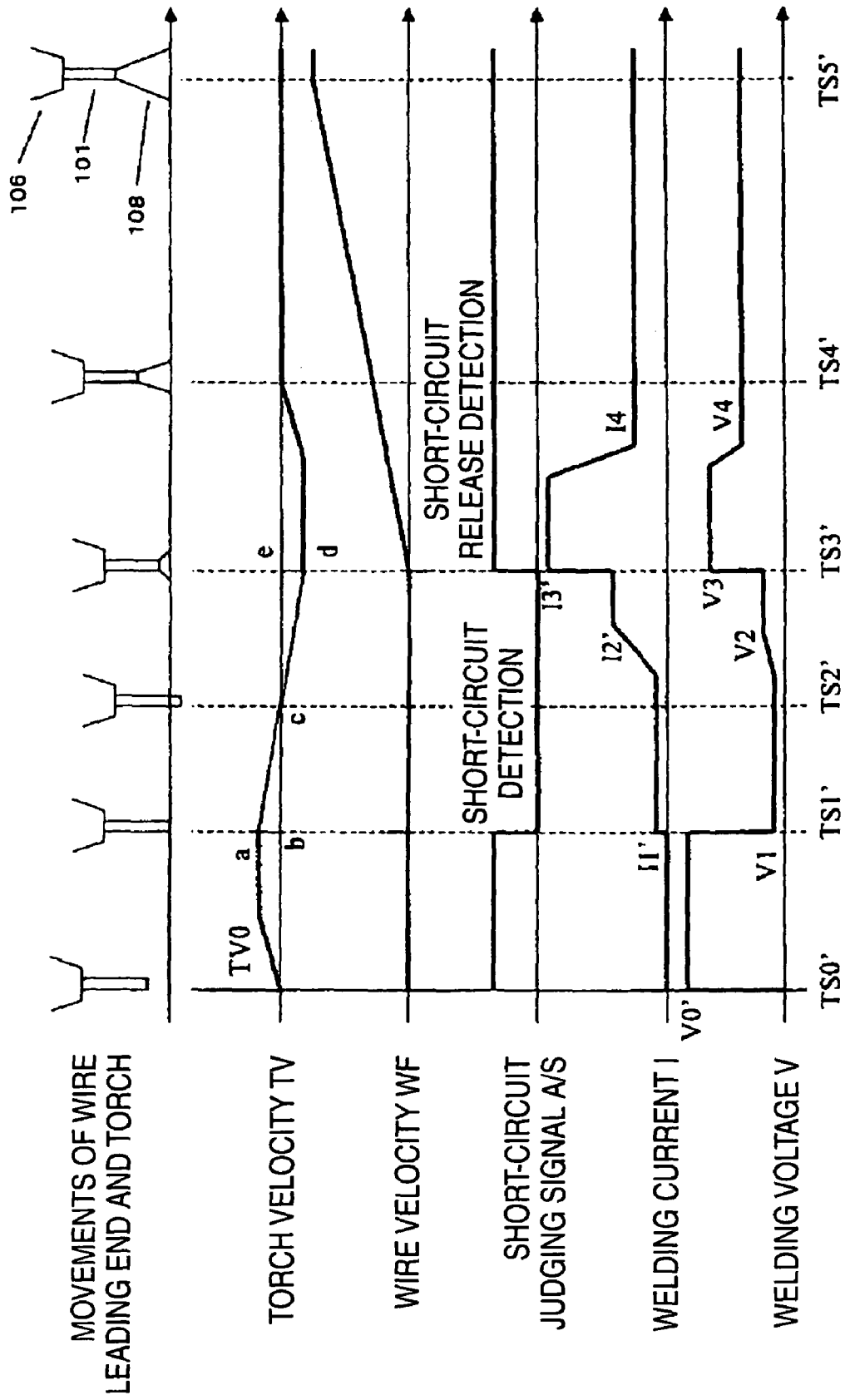
FIG. 5 is a timing chart in arc start time in the related art.

Therefore, in order to lessen the pressing amount of the welding wire 1, it is necessary to lessen the follow-up delay of the torch velocity TV Further, in the welding process in the embodiment, the operating direction of the welding torch 4 from the position at the time TS0 is only the direction separating from the base material 7, which is different from the case in the conventional example in which the welding torch 104 moves also to the base material 107 side from the position at the time TS0' as described referring to FIG. 5. Therefore, there is no anxiety of buckling as indicated in the conventional example due to the vibration caused by the change of the velocity direction.

Further, it is preferable that the resultant velocity of the welding torch 4 velocity and the welding wire 1 velocity is constant. Therefore, it is good to adjust the velocity follow-up error so as to be minimized.

On the other hand, regarding the usual operation and positioning of the robot manipulator 9, the welding torch 4 located in a retreat position at the time TS0 in order to supply the base material 7 is moved in a weld start position by driving the robot manipulator 9 by the robot controller 10.

At this time, it is preferable that the leading end of the welding wire 1 stops without overshooting to the base material 7 side. This is because there is fear that the overshoot of the leading end of the welding wire 1 will cause the contact of the leading end of the welding wire 1 with the base material 7 at the unintentional point of time.

However, since the movement of the welding torch 4 in the welding direction after the TS4 requires locus accuracy, that is, follow-up characteristic, it is preferable to increase the FF gain within an allowable value of the overshoot.

Next, a position control loop in the embodiment, which is constructed in the robot controller 10, will be described.

Figure 6:
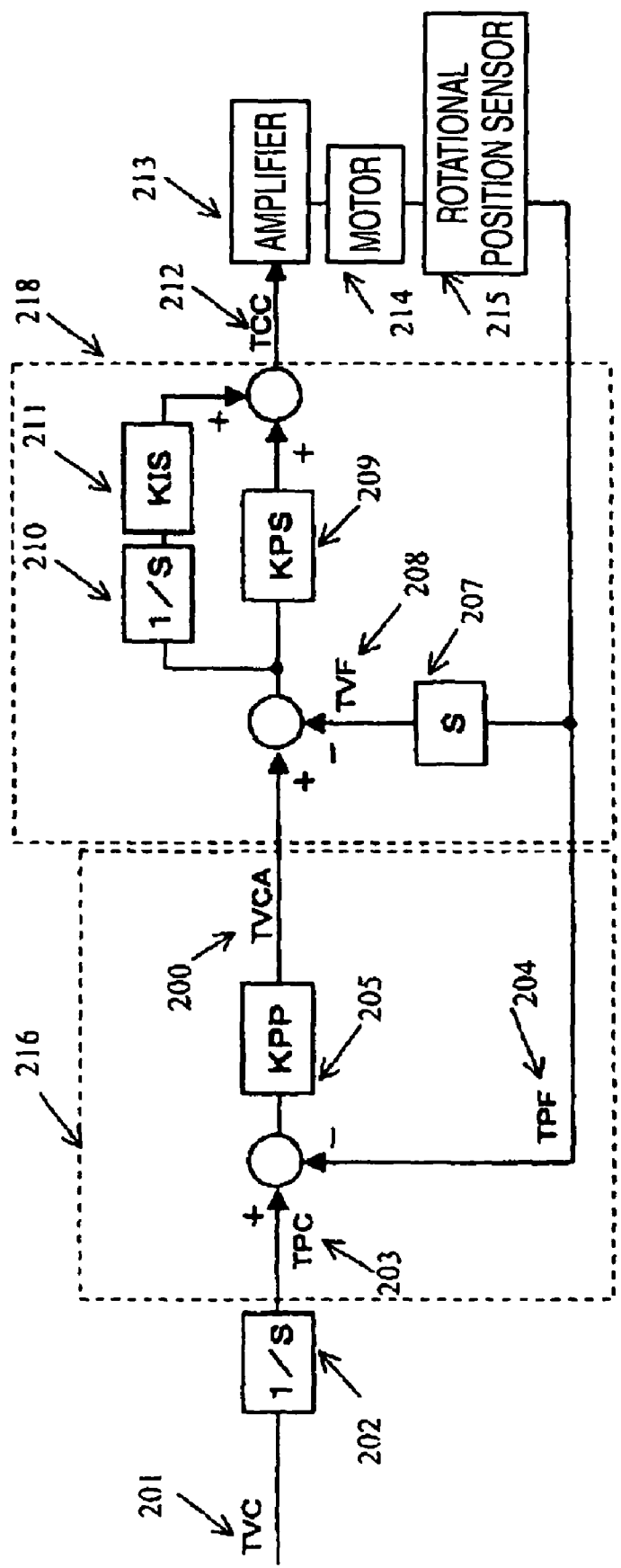
FIG. 6 is a block diagram showing a position control loop in the related art.

FIG. 1 is a block diagram showing a position control loop constructed in the robot controller 10. In FIG. 1, the same components as those in FIGS. 6 and 9 are denoted by the same reference numerals.

Figure 9:
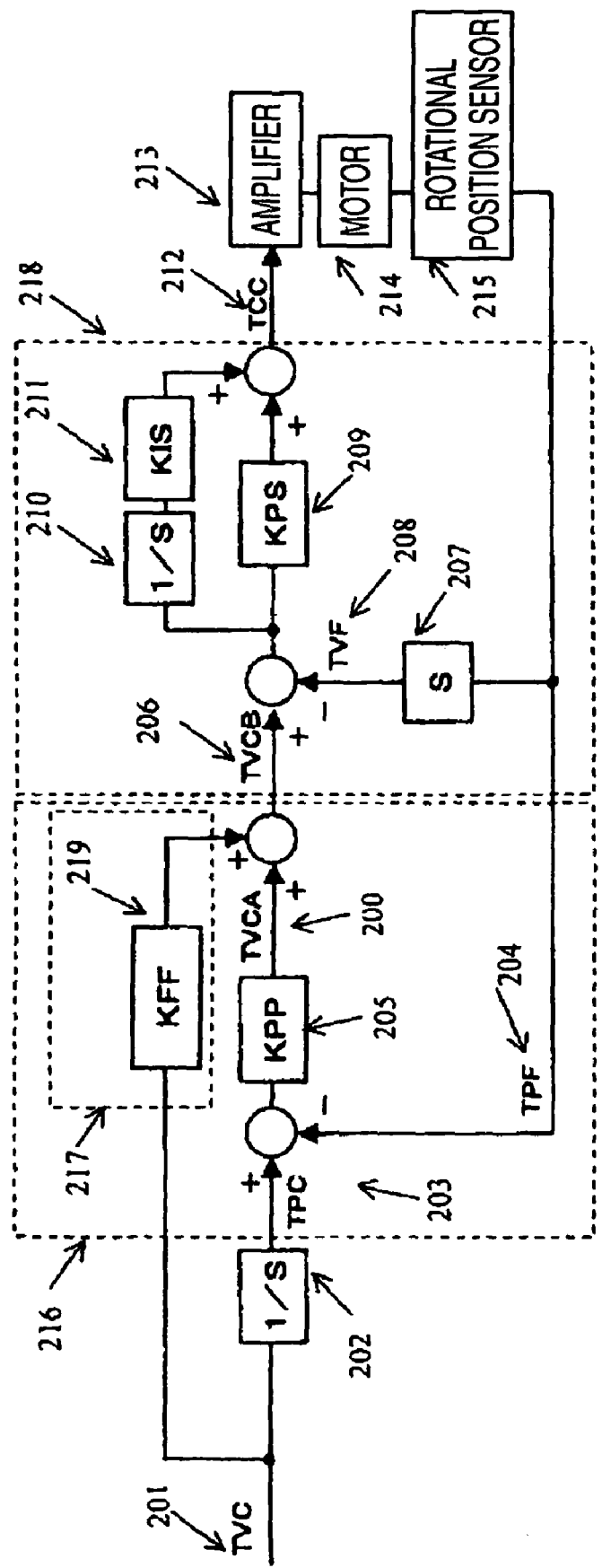
FIG. 9 is a block diagram showing a position control loop in the related art, to which feedforward control has been added.
Figure 10:
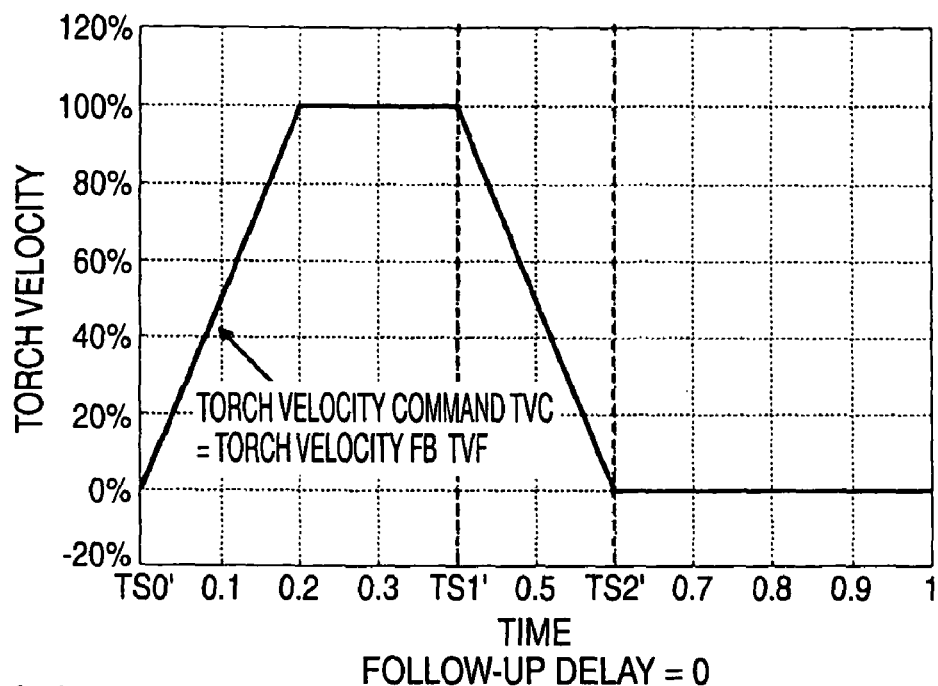
FIG. 10(*a*) is a graph showing the relation between a torch velocity command and feedback in case that there is no follow-up delay in a torch pull-up operation, in which the relation is represented by time and torch velocity.
Figure 10:
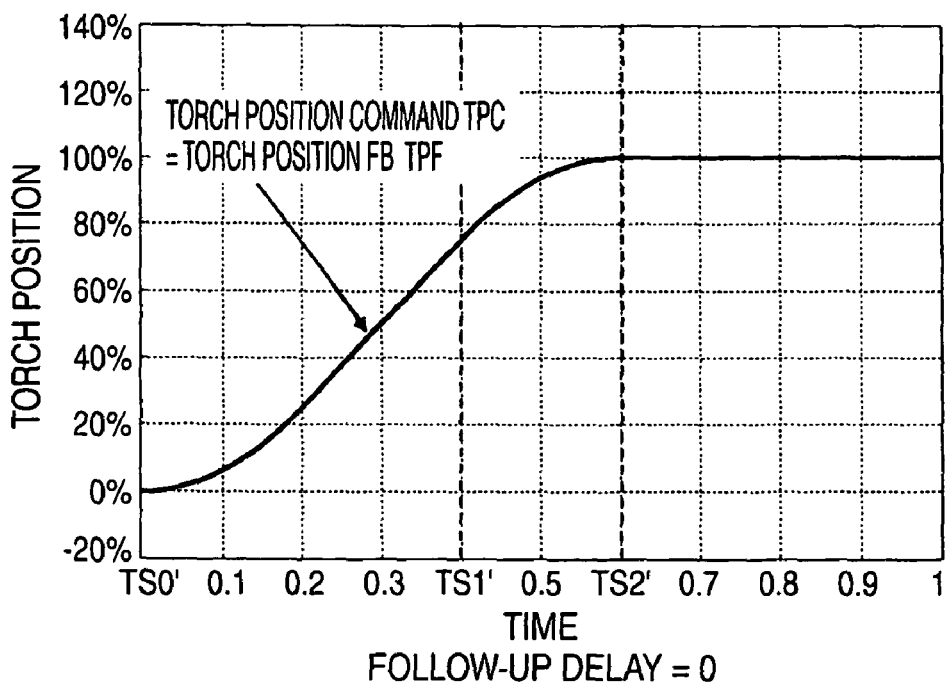
Figure 11:
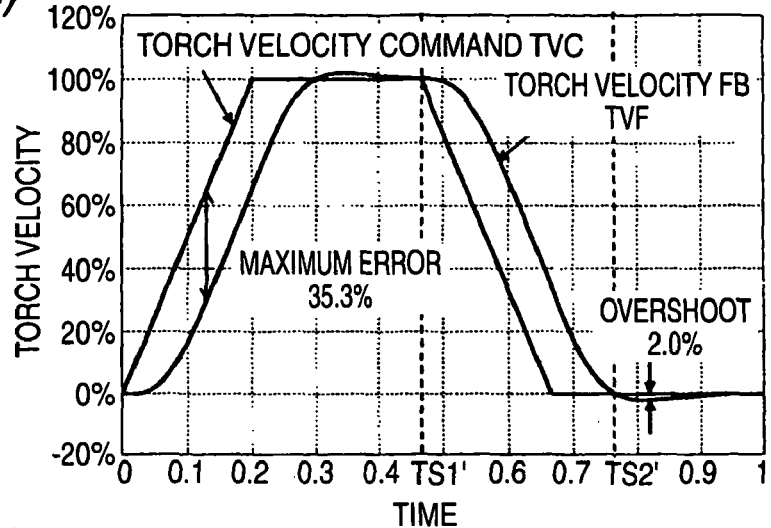
FIG. 11(*a*) is a graph showing the relation between a torch velocity command and feedback in the torch pull-up operation when feedforward gain is zero, in which the relation is represented by time and torch velocity.
Figure 11:
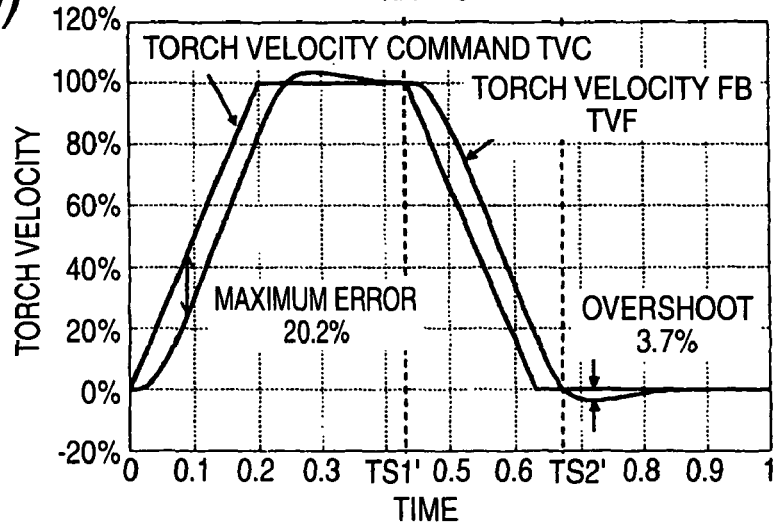
Figure 11:
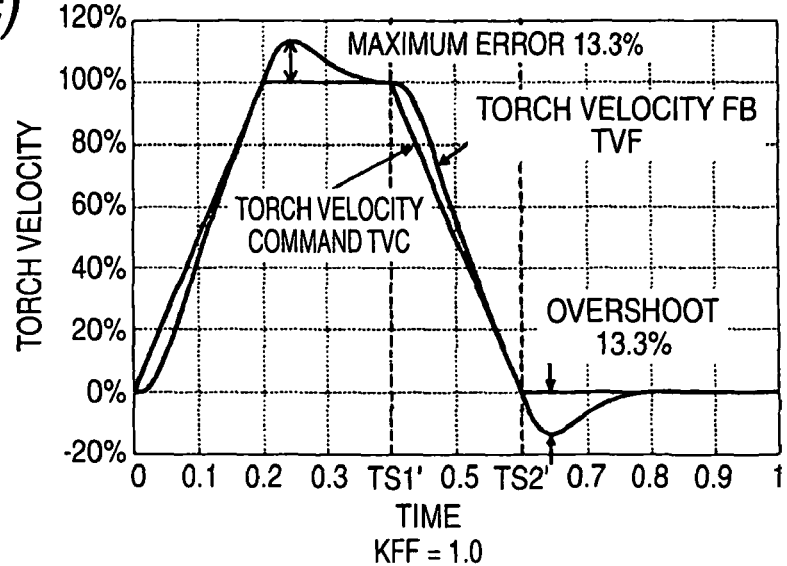
Figure 12:
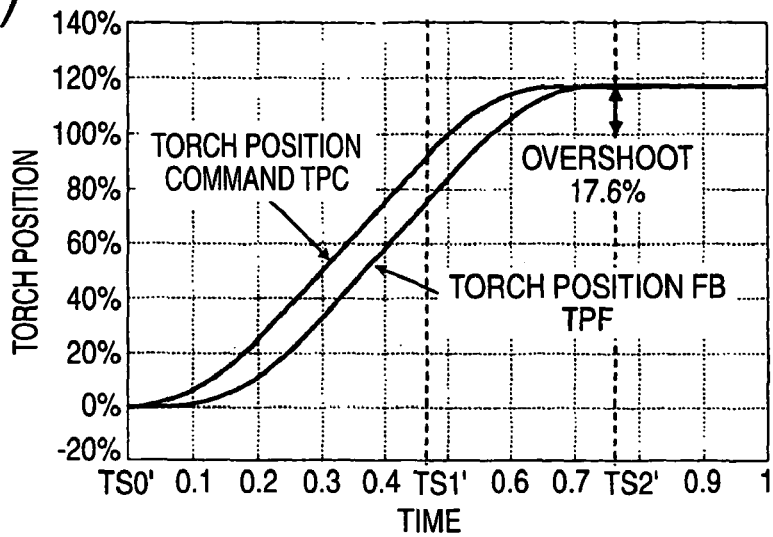
FIG. 12(*a*) is a graph showing the relation between a torch velocity command and feedback in the torch pull-up operation when feedforward gain is zero, in which the relation is represented by time and a torch position.
Figure 12:
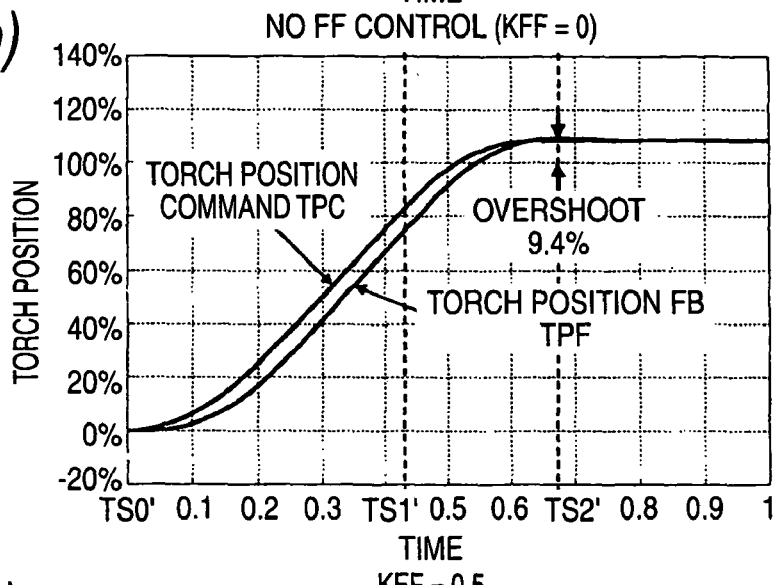
Figure 12:
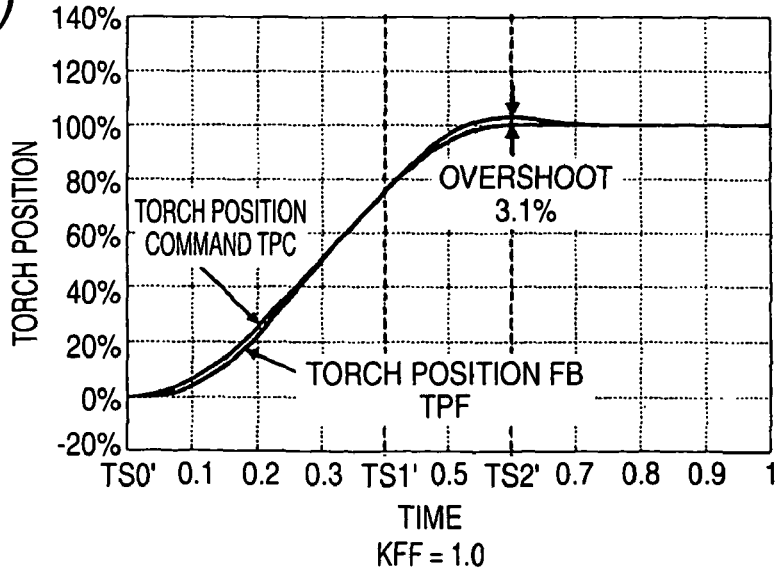

The position control loop shown in FIG. 1 is constructed by adding, to the position control loop in the conventional example described referring to FIG. 9, a torch separation control block 224 for improving responsibility of only the torch pull-up operation in the arc start time.

Further, in FIG. 1, the velocity command includes a torch pull-up velocity command TUVC 222 relating to the welding torch pull-up operation from the time TS1 of the welding start time in FIG. 3 to the time TS4, and a usual operation velocity command TNVC 223 relating to the usual operation other than the welding torch pull-up operation.

This torch separation control block 224 performs FF (feed-forward) control on the basis of the torch pull-up velocity command TUVC 222 in order to improve responsibility of the operation of moving the welding torch 4 in the welding start in the direction separating from the base material 7. This torch pull-up velocity command TUVC 222 is outputted when the robot controller 10 performs the control of moving the welding torch 4 in the welding start in the direction separating from the base material 7, but not outputted in the usual operation.

A velocity loop command TVCB 206 in the control loop of FIG. 1, outputted from a position control loop 216 to a velocity loop 218 will be described. The torch pull-up velocity command TUVC 222 multiplied by a velocity FF gain KFFB 221 is added to the usual operation velocity command TNVC 223 multiplied by a velocity FF gain KFFA 220, and this added result is added to the velocity loop command TCVA 200 calculated by the Numerical Expression 1, whereby the velocity loop command TVCB 206 is obtained. This TVCB is expressed by the following Numerical Expression (Numerical Expression 4).

$$TVCB = TVCA + KFFA \times TNVC + KFFB \times TUVC \qquad \text{[Numerical Expression 4]}$$

Herein, each range of the velocity FF gains KFFA and KFFB is as follows:

$0 \leq KFFA < 1.0$ $0 \leq KFFB \leq 1.0$

Herein, each range of the velocity FF gains KFFA and KFFB is as follows:

Next, a position command TPC 203 outputted to the position control loop 216 will be described. The position command TPC 203 is obtained by integrating the sum of the torch pull-up velocity command TUVC 222 and the usual operation velocity command TNVC 223. This position command TPC is expressed by the following Numerical Expression (Numerical Expression 5).

$$TPC = \int (TNVC + TUVC) dt \qquad \text{[Numerical Expression 5]}$$

Further, when KFFA=KFFB=0, the control command in FIG. 1 becomes the same as that in the control loop control shown in FIG. 6 as the conventional example having no FF.

As described before, it is preferable that the follow-up performance in the usual operations before the TS0 and after the TS4 is improved by increasing the FF gain within the allowable value of the overshoot.

In case that the velocity FF gain KFFA 220 by which the usual operation velocity command TNVC 223 is multiplied is set, for example, to 0.5, the follow-up characteristics shown in FIGS. 7(b) and 8(b) are obtained. Herein, thought the overshoot in position is not greater than 1%, the follow-up characteristic is improved and the maximum error in position is reduced to 9.2%.

On the other hand, for the torch pull-up operation from the time TS1 of the welding start shown in FIG. 3 to the time TS4, it is necessary to lessen the follow-up delay of the torch velocity TV and minimize the velocity follow-up error. Therefore, in case that the velocity FF gain KFFB by which the torch pull-up velocity command TUVC 222 is multiplied is set, for example, to 1.0, the follow-up characteristics shown in FIGS. 7(c) and 8(c) are obtained. Hereby, the follow-up delay in the velocity and the maximum error can be minimized.

As described above, in the position control loop of the robot controller 10, the torch separation control block 224 shown in FIG. 1 is provided, the torch pull-up velocity command TUVC 222 and the usual operation velocity command TNVC 223 are input separately, and the torch pull-up velocity command TUVC 222 is outputted only when the robot controller 10 performs the such controls to move the welding torch 4 in the direction separating from the base material 7, but not outputted in the usual operation time. Hereby, it is possible to heighten the velocity follow-up performance in movement of the welding torch 4 by the torch separation control block 224 in the welding start time, so that the useless time in the arc generation sequence can be reduced, and buckling and spatter generation of the welding wire 4 can be prevented.

Further, since the torch pull-up velocity command TUVC 222 is not outputted in the usual operation time, the overshoot by the torch separation control block 224 is not generated in the usual operation time, so that the usual operation can be performed.

Namely, by constructing the position control loop shown in FIG. 1, the velocity follow-up characteristics in the torch pull-up operation from the TS1 of the welding start to the TS4 and in the usual operation other than the torch pull-up operation can be adjusted most suitably.

In the control process in the embodiment, as described above, the moving direction of the welding torch 4 from the position at the time TS0 of the weld starting time is only the direction separating from the base material 7. Therefore, there is no anxiety that the vibration of the welding torch 4 is generated by the reversal of the velocity direction of the welding torch 4 and the welding wire 1 buckles as the conventional example.

Further, in case that arc start is executed while moving the welding torch 4 in the welding direction, the welding direction operation and the torch pull-up operation are simultaneously performed. Also in this case, the velocity command separates into the torch pull-up velocity command TUVC 222 relating to the welding torch pull-up operation from the time TS1 in the welding start shown in FIG. 3 to the time TS4, and the usual operation velocity command TNVC 223 in the usual operation other than the torch pull-up operation. Therefore, the velocity follow-up characteristics in the welding direction operation and in the torch pull-up operation can be most suitably adjusted respectively. Further, in a system in which the pull-up velocity command TUVC 222 and the usual operation velocity command TNVC 223 are not separate but one velocity command changes the FF gain, the appropriate change of the FF gain is difficult and it is difficult to execute the arc start while moving the welding torch in the welding direction.

It is desirable that the welding robot in the welding system of the invention adopts a below-described collision detecting method.

Recently, the robot requires, in order to improve safety in the collision time or to prevent breakdown loss in that time, high accuracy in detection of collision. However, use of a collision sensor of high accuracy causes increase of cost, and causes the sensor to move as a weight load, which is contrary to high-speed operation of the robot and energy saving thereof Therefore, sensorless detection of collision power at high accuracy is required.

As methods of finding the collision power without a sensor, there are a method of finding the collision power by subtracting kinetic torque of the robot found by an inverse kinetic calculation of the robot from reduction gear output torque obtained by subtracting torque lost by inertia and friction of the motor and the reduction gear from torque generated by a drive current of the motor (hereinafter, referred to as kinetic calculation method. Refer to Non-Patent Document 1), and a method of finding the collision power by means of disturbance elimination observer (hereinafter, referred to as a disturbance estimation observer method).

Figure 14:
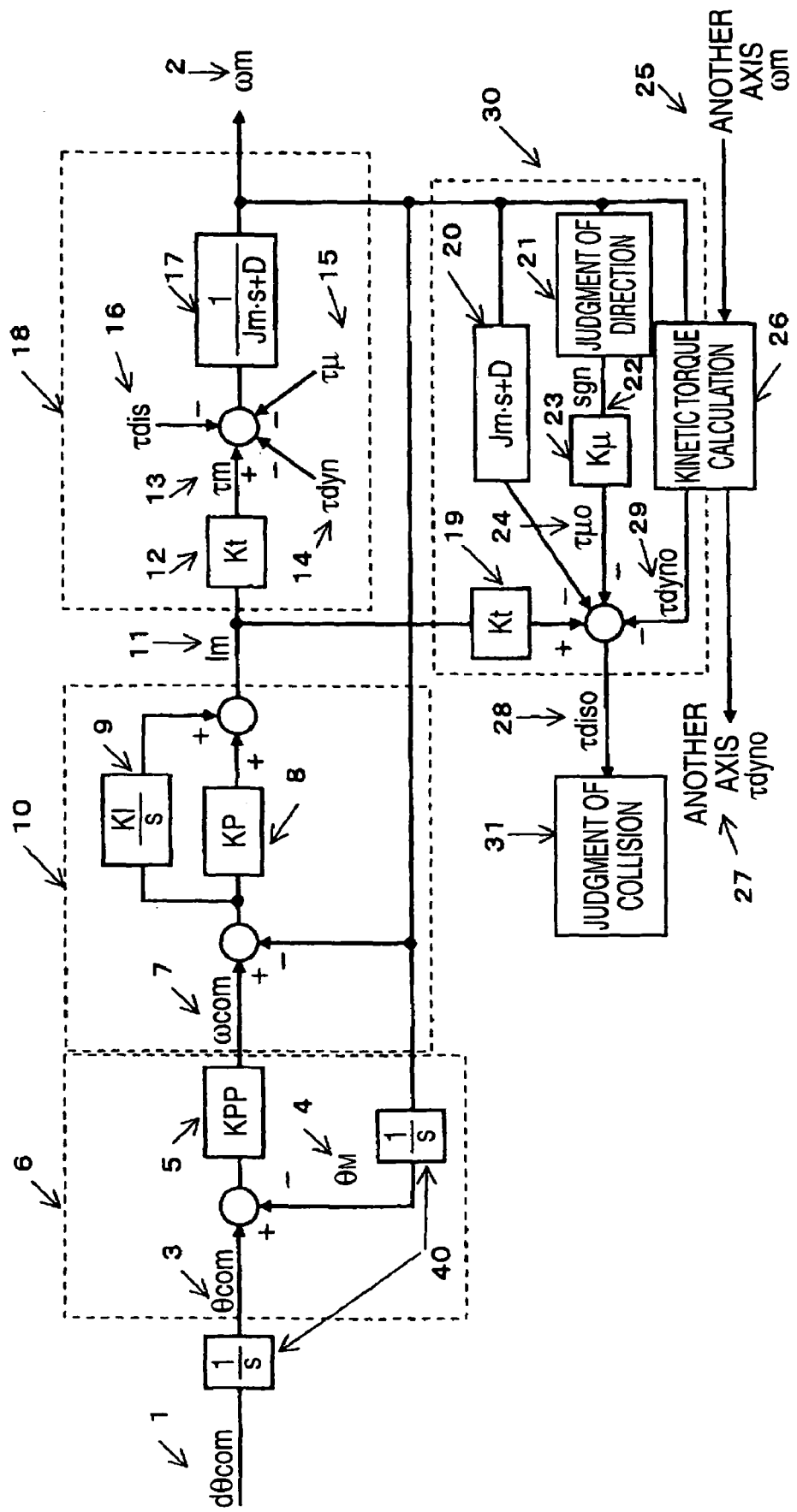
FIG. 14 is a block diagram showing a collision detecting method (kinetic calculation method) in the related art.

FIG. 14 is a control block diagram of the kinetic calculation method.

In FIG. 14, a reference numeral 6 is a position control block, which generates a velocity loop command $\overline{\omega}$ com 7 based on a difference value between a position command θ com 3 obtained by integrating a velocity component d θ com 1 of a position command, and a motor position feedback θ m 4 obtained by integrating a motor velocity feedback $\overline{\omega}$ com 2.

A reference numeral 10 in FIG. 14 is a velocity control block, which generates a motor current command Im 11 based on a difference value between the velocity loop command $\overline{\omega}$ com 7 and the motor velocity feedback $\overline{\omega}$ com 2.

A reference numeral 18 in FIG. 14 is a block showing a motor and external force. A reference character τ m 13 is motor generating torque. Assuming that the reduction gear is a rigid body, the motor generating torque τ m 13 is expressed by Numerical Expression 6-1 in the below-described Numerical Expression 6, seen from the motor driving side, and by Numerical Expression 6-2, seen from the load side.

[Numerical Expression 6]

$$\tau m = Kt \times Im \quad \text{(Numerical Expression 1-1)}$$

$$\tau m = \tau dyn + \tau dis + Jm \times \alpha m + D \times \overline{\omega} m + \tau \mu \quad \text{(Numerical Expression 1-2)}$$

In the Numerical Expression 1-1 and the Numerical Expression 1-2, reference characters are as follows:

Kt 12: Motor torque constant

Im 11: Motor current

αm: Motor angular acceleration (differential value of $\overline{\omega}$m)

$\overline{\omega}$m 2: Motor angular velocity

Jm: Motor inertia (rotor+reduction gear primary side)

D: Viscosity friction coefficient

τμ15: Kinetic friction torque

τdyn 14: Kinetic torque (sum of gravitational torque, inertial force, centrifugal force and Coriolis force)

τdis 16: Collision torque

Further, the above-indicated kinetic friction torque τ μ 15 can be calculated by the following Numerical Expression 7.

$$\tau \mu = K \mu \times sgn, \quad \text{[Numerical Expression 7]}$$

wherein Kμ is the magnitude of kinetic friction, and $$sgn = \begin{cases} 1 & (\omega m > 0) \\ 0 & (\omega m = 0) \\ -1 & (\omega m < 0) \end{cases}$$

Further, the collision torque τdis on the right side of the Numerical Expression 6-2 can be obtained by the following Numerical Expression 8 which is modified on the basis of the Numerical Expression 6-1 and the Numerical Expression 6-2.

$\tau dis = (Kt \times Im - Jm \times \alpha m - D \times \overline{\omega} m - K\mu \times sgn) - \tau dyn$  [Numerical Expression 8]

In the above Numerical Expression 8, $Kt \times Im - Jm \times \alpha m - D \times \overline{\omega} m - K\mu \times sgn$ is torque outputted to the reduction gear by the motor, and τdyn is kinetic torque.

In FIG. 14, a reference numeral 30 represents the Numerical Expression 8 as a collision torque estimation block.

In the collision torque estimation block 30, a kinetic torque estimation value τdyno 29 can be obtained by executing the inverse kinetic calculation in a kinetic torque calculation block 26 by means of motor velocity feedback of all shafts constituting the robot and mechanical parameters of the robot. The collision torque estimation block 30 finds a collision torque estimation value τdiso 28 by means of this kinetic torque estimation value τdyno 29, and outputs this collision torque estimation value τdiso 28 to a collision judging block 31.

The collision judging block 31 detects collision, by means of a predetermined collision detecting threshold τth, in accordance with the following Numerical Expression 9.

$|\tau diso| > \tau th$  [Numerical Expression 9]

The above-described conventional kinetic calculation method presupposes that the reduction gear is the rigid body.

However, the reduction gear actually includes a spring component, and vibration can be generated by this spring component.

Figure 15:
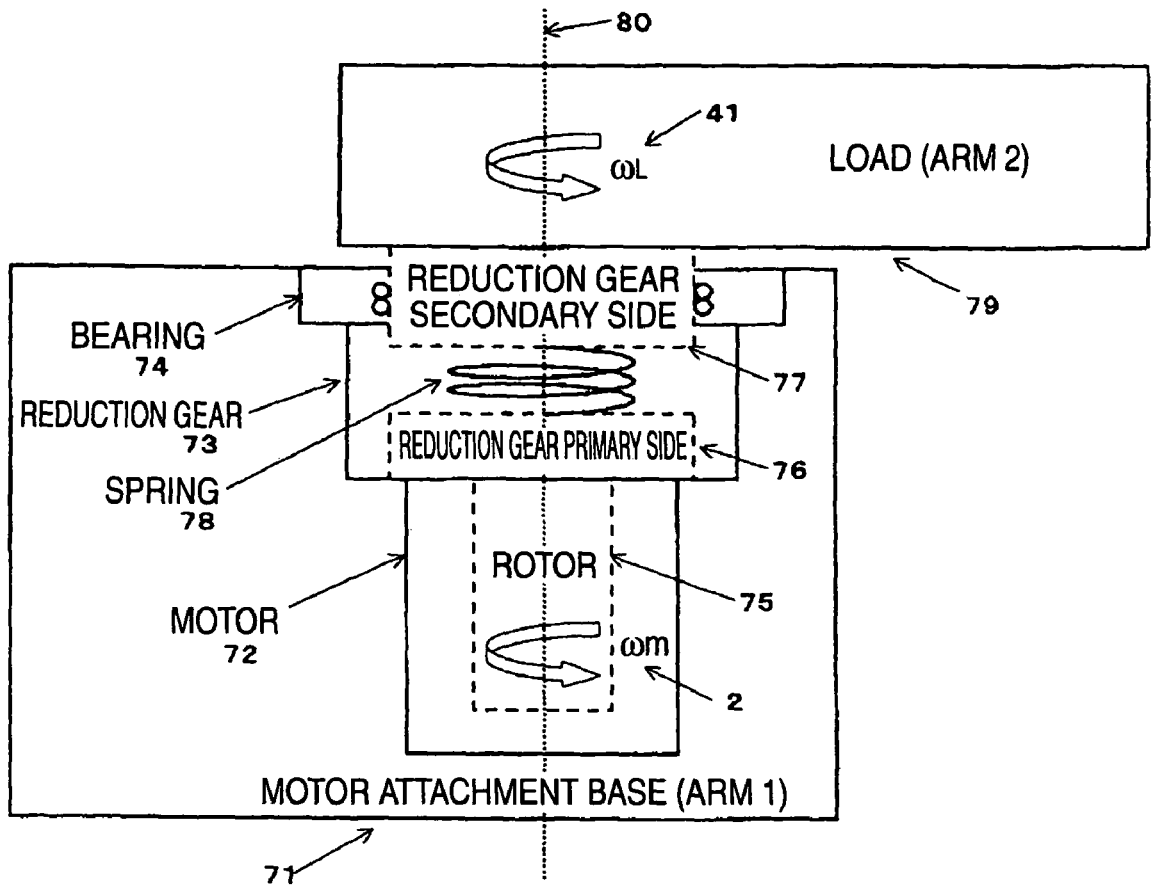
FIG. 15 is a block schematic diagram showing a spring component in a reduction gear of a robot.

FIG. 15 is a diagram in which a motor and a reduction gear in a robot are modeled. Herein, a motor 72, a reduction gear 73, a bearing 74 are fixed to an arm 1(71) that is a base for motor attachment, and they drive an arm 2 (79) that is a load coupled to a rotary part on a reduction gear secondary side 77.

A reduction gear primary side 76 is coupled to a rotor in the motor through a motor rotation axis 80, and rotates at a motor rotation velocity $\overline{\omega}m2$. The reduction gear 73 reduces the motor rotation velocity $\overline{\omega}m2$ to a load rotation velocity $\overline{\omega}L$ 41 at a reduction ratio Rg.

Here, the reduction ratio Rg of the reduction gear 73 is expressed by the following Numerical Expression 10.

$Rg = \overline{\omega}m / \overline{\omega}L$  [Numerical Expression 10]

However, as the reduction gear 73 includes the spring component between the reduction gear primary side 76 and the reduction gear secondary side 77, only a case of a steady state in which expansion of the spring is constant satisfies the Numerical Expression 10.

Figure 16:
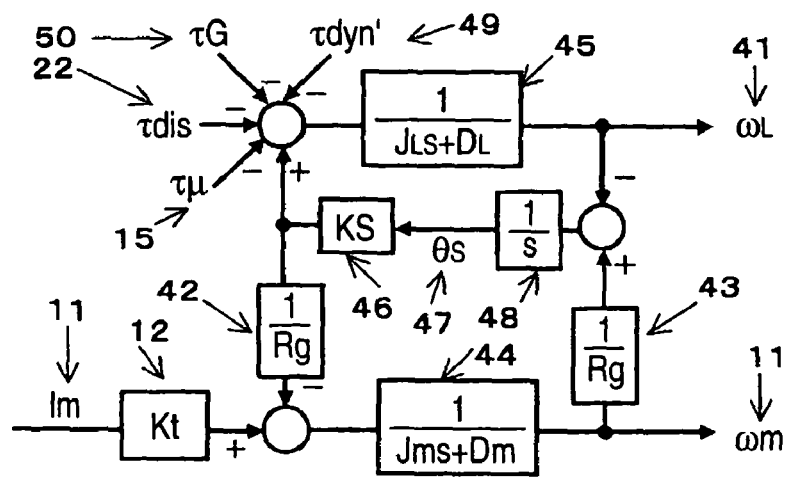
FIG. 16 is a block diagram in which the spring component of the reduction gear of the robot is modeled.

In FIG. 16, the model shown in FIG. 15 is represented by a block diagram, taking spring constant of this spring component as KS.

In FIG. 16, a reference character Im 11 is a motor current command for driving the motor 72, Kt 12 is torque constant of the motor 72, 1/Rg 42,43 is the reciprocal of the reduction ratio, a reference numeral 44 is a motor transfer function, 45 is a load transfer function, KS 46 is spring constant of the reduction gear 73, θs 47 is an angle of torsion generated between the reduction gear primary side 76 and the reduction gear secondary side 77, and 48 is integration.

A reference character τdis 22 is a collision torque applied onto the load (arm 2), τdyn' 49 is a kinetic torque in which inertial force and gravitational torque of the self-axis are removed, τG 50 is a gravitational torque, and τμ 15 is a kinetic friction torque.

In the motor transfer function 44, motor inertia Jm is moment of inertia around the rotation axis 80 of the motor rotor 75 and the reduction gear primary side 76, and Dm is a coefficient of motor viscosity friction.

Also in the load transfer function 45, load inertia JL is moment of inertia around the rotation axis 80 of the load (arm 2) 79 and the reduction gear secondary side 77, and DL is a coefficient of load viscosity friction.

Particularly, in a large-sized robot, a resonance frequency of the spring component of the modeled reduction gear becomes a low frequency that is 10 Hz or less in FIG. 16. As the dynamic frequency of the robot comes closer to this resonance frequency, the probability of generation of vibration increases.

In the usual use of the robot, in order to prevent the vibration from being generated, the acceleration and deceleration is controlled so that the dynamic frequency of the robot becomes lower than the resonance frequency of the spring component. Therefore, so large a problem does not arise. However, in the welding use of the robot, the torch pull-up operation in the arc start time which has been described in Patent Document 2, and a weaving operation of vibrating the torch require responsibility even if the vibration is generated a little and the locus accuracy deteriorates a little. Therefore, there is high possibility that the dynamic frequency of the robot comes close to the resonance frequency of the spring component.

In this case, if a collision detecting threshold is set in disregard of the vibration due to the spring component of the reduction gear, there is possibility of erroneous detection in which the collision is detected though there is no collision.

Figure 17:
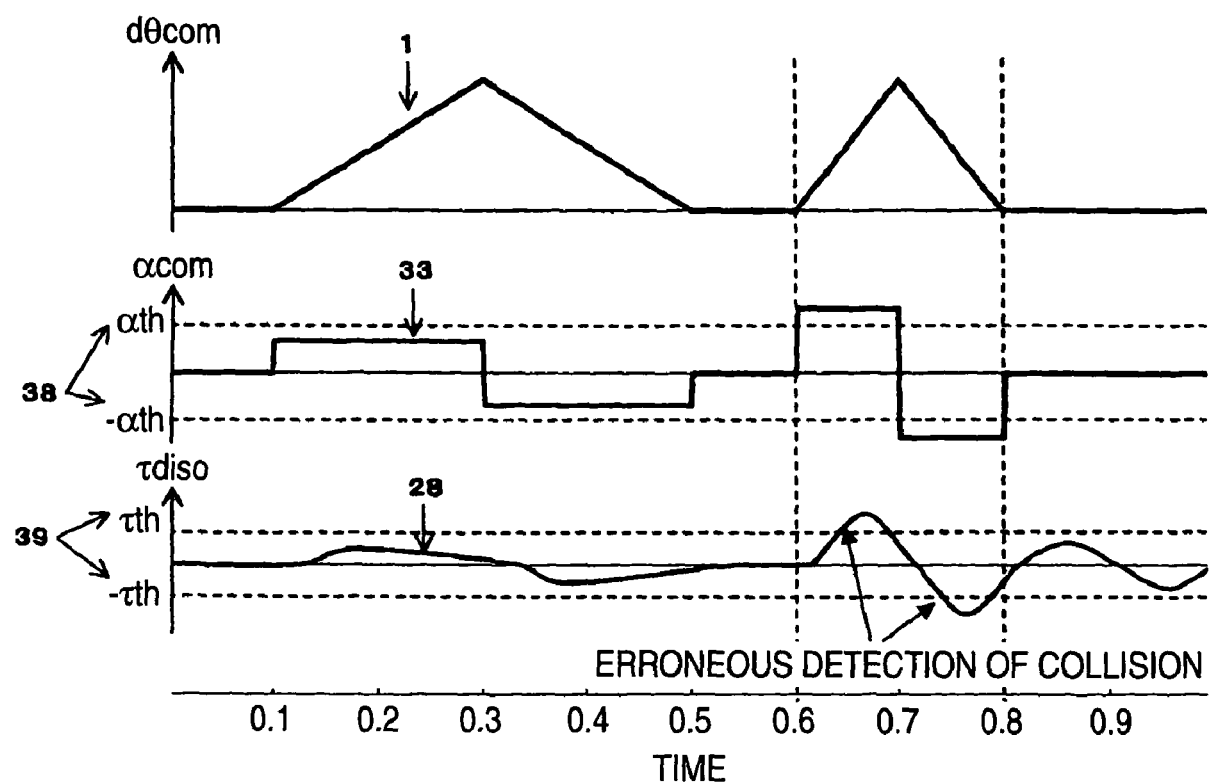
FIG. 17 is a waveform chart showing collision judgment in an embodiment of the related art.

FIG. 17 shows an example of this erroneous detection, in which the time 0.1 to the time 0.5 represent the usual operation, the time 0.6 to the time 0.8 represent the torch pull-up operation. In FIG. 17, in descending order, there are shown time change of the velocity component dθcom 1 of the position command, time change of an acceleration component αcom obtained by differentiating the above velocity component, and time change of the collision torque estimating value τdiso 28.

In the usual operation, an absolute value of the acceleration component αcom is controlled so as not to exceed the acceleration threshold αth in order to prevent the vibration due to the spring component of the reduction gear from being generated. This acceleration threshold αth is obtained by the actual usual operation.

However, since the torch pull-up operation requires the responsibility even if the vibration is generated a little and the locus accuracy deteriorates a little, there is possibility that the acceleration component αcom at this time will exceed the acceleration threshold αth.

In the conventional kinetic calculation method shown in FIG. 14, since the spring component of the reduction gear is not modeled as the spring component shown in FIG. 16, the vibration due to the spring component appears as an error of the collision torque estimation value τdiso 28 as it is. This condition is shown between the time 0.6 and the time 0.8 in FIG. 5, in which the absolute value of the collision torque estimation value τdiso 28 exceeds the collision detection threshold τth 39 twice.

In case that such the phenomenon is generated, there is produced the erroneous detection in which the collision is detected though there is no collision. Only to increase the collision detection threshold τth 39 prevents this erroneous detection. However, in this case, collision detecting sensibility lowers to the contrary. Therefore, the detection when the collision is actually generated is delayed. The delay in detection of collision causes delay in taking the step of relieving shock due to the collision, which gives damage to the arm, the reduction gear, and the work.

On the other hand, as the disturbance estimation observer method, there has been known a method of realizing the detection of collision with a model in which a reduction gear has a spring as a target (refer to, for example, Patent Document 3).

Figure 18:
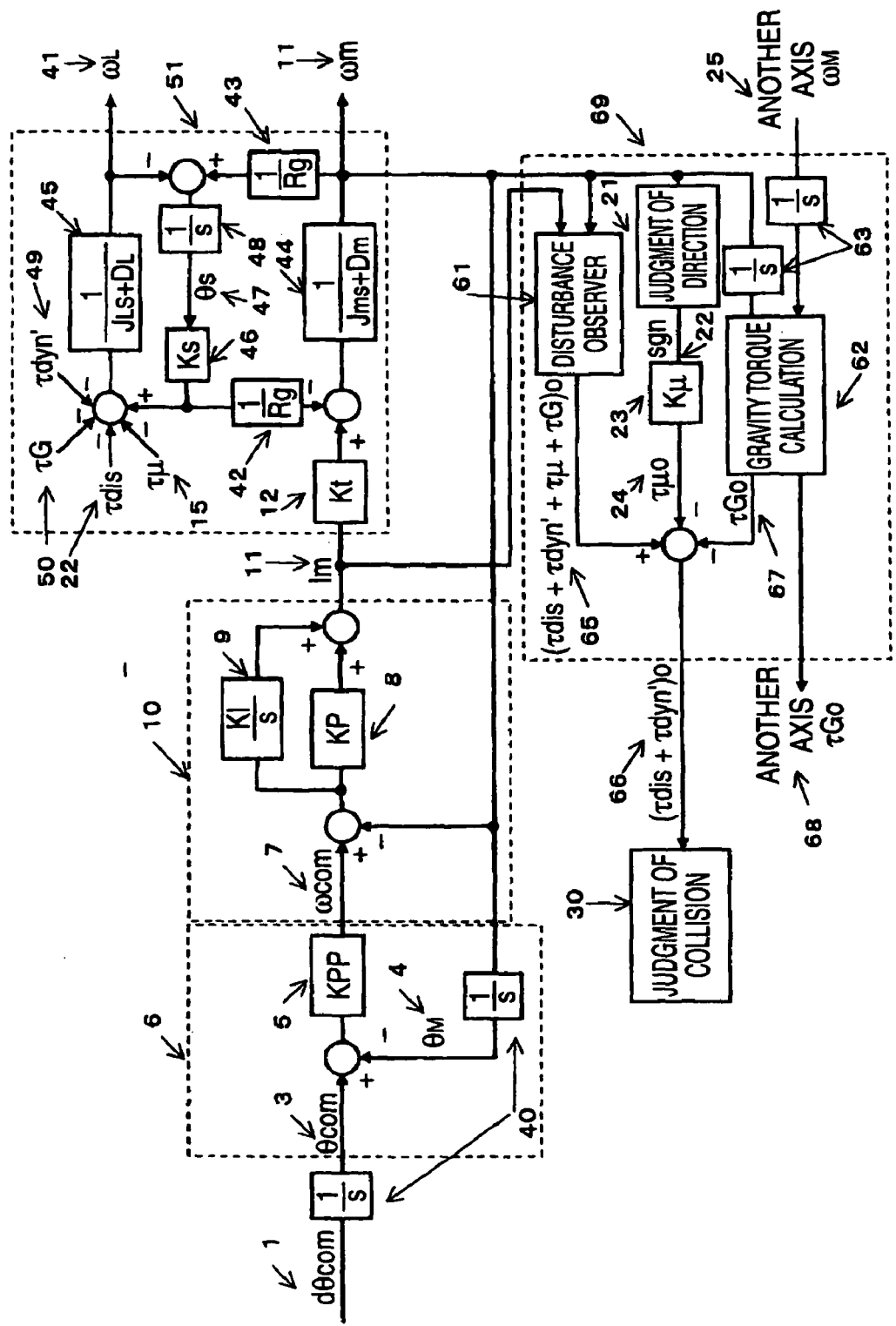
FIG. 18 is a block diagram showing a collision detecting method (disturbance observer method) in the related art.

FIG. 18 shows a block diagram for explaining the disturbance observer method. In a collision torque estimation block 69, a disturbance estimation observer 61 estimates a load rotation velocity $\overline{\omega}L$ 41, an angle of torsion θs 47 and the sum of disturbance torques (τdis+τdyn'+τμ+τG)o 65 by means of a motor current Im 11 and a motor rotation velocity $\overline{\omega}m$ 11 as input parameters, and motor inertia Jm, load inertial JL, a coefficient of motor viscosity friction Dm, a coefficient of load viscosity friction DL, a reduction gear spring constant KS 46, and reduction gear ratio RG as calculation parameters.

A gravity torque calculating block 62 calculates a gravity torque estimation value from positional information of all the axes constituting the robot (integration of velocity 63), and outputs a gravity torque estimation value τGo 67.

The collision torque estimation block 69 subtracts the gravity torque estimation value τGo 67 and a kinetic friction torque estimation value τμo 24 from the sum of disturbance torques (τdis+τdyn'+τμ+τG)o 65, and outputs a collision torque estimation value (τdis+τdyn')o 66 to the collision judging block 30.

Patent Document 2: JP-A-2002-205169
Patent Document 3: JP-A-2000-52286
Non-Patent Document 1: Kosuge Kazuhiro and other one person, "Detection of Dynamic Collision of Manipulator", The Japan Society of Mechanical Engineerings [No. 99-9] Robotics Mechatronics Lecture Meeting, '99 Lecture Paper 2A1-11-030

However, the conventional disturbance estimating observer method has the following problems.

A first problem is that the kinetic torque τdyn' 49 from which the inertial force of the self-axis and the gravity torque are removed is included in the collision torque estimation value (τdis+τdyn')o 66. The kinetic torque τdyn' 49 is mainly composed of interference forces (centrifugal force, Coriolis force) from other axes.

Since this kinetic torque τdyn' 49 becomes an erroneous component, it is thought that the collision detecting threshold τth becomes greater (the collision detecting sensibility becomes lower) than that in the kinetic calculation method. Namely, even in case that the spring component of the reduction gear is modeled on purpose as shown in FIGS. 15 and 16, there is possibility that the collision detecting sensibility lower more than that in the kinetic calculation method.

A second problem is that: the disturbance observer 61 requires the exact values of the load inertia JL and the spring constant KS 46; and if there are errors in these parameters, an error is generated also in disturbance estimation, and the effect that the spring is modeled is reduced.

Since the load inertia JL varies by posture of the robot and the load attached to the arm, it must be calculated in real time, and its calculation is possible.

Figure 19:
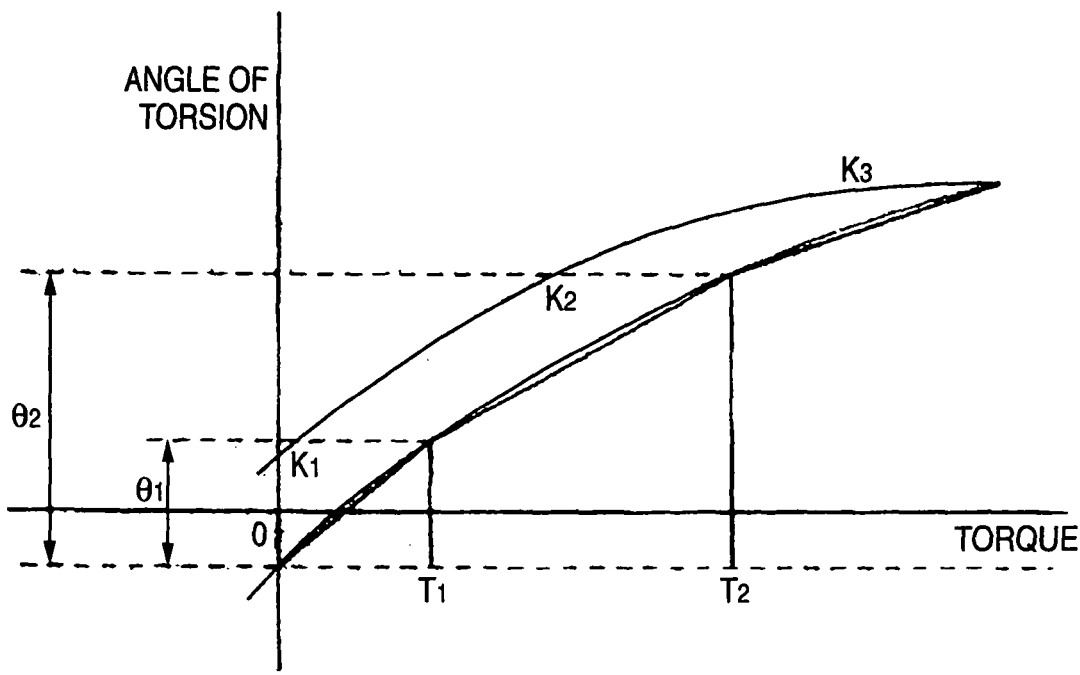
FIG. 19 is a graph showing spring constant of a robot reduction gear (harmonic reduction gear).

However, there is a problem in that the spring constant KS 19 is set to a fixed value. FIG. 19 is a diagram showing an example of a spring constant KS in a harmonic reduction gear that is typical of the reduction gear used in the robot, which is described in a catalog of a maker. In FIG. 19, as the angle of torsion changes, the spring constant also changes. Therefore, the spring constant is represented by an approximate straight line of three-stages, and torque constant at their stages are taken as K1, K2, and K3. Regarding the spring constant having high frequency of use in the robot and a deceleration ratio of 80 and more, in case that an average value of K1, K2 and K3 is found from maker catalog values, and an error of each of K1, K2 and k3 is calculated on the basis of its average value, the error comes to about 33% maximum.

Further, the angle of torsion θs 47 and the load rotation velocity $\overline{\omega}L$ 41 are not measured directly but are estimated as variables of the disturbance estimation observer. Therefore, as the spring constant KS 46 changes, the estimation value of the angle of torsion θs 47 also changes. However, actually, the spring constant KS 46 is a function of the angle of torsion θs 47, and they subject to each other. Therefore, the estimation is impossible.

Therefore, in order to satisfy the disturbance estimation observer, there are no other methods than a method in which the spring constant KS 46 is regarded as a constant value. However, there is a high possibility that the error in the spring constant will worsen accuracy of the disturbance estimation value.

Namely, even in case that the spring component of the reduction gear is modeled, the accuracy in detection of the collision force is not always increased sufficiently. Therefore, it is difficult to remove the possibility of the erroneous detection in which the collision is detected though there is no collision.

Therefore, the method of detecting robot collision of the invention has an object to prevent erroneous detection of collision when dynamic frequency of a robot comes closer to a resonance frequency of a spring component of a reduction gear (for example, in the pull-up operation of the welding torch) without lowering collision detecting sensibility when the dynamic frequency of the robot is low (for example, in the usual operation time).

In order to achieve the above object, the method of detecting robot collision of the invention includes a collision detecting method for a robot driven by a motor through a reduction gear, in which external force due to collision is detected without a sensor by subtracting a kinetic torque obtained by an inverse kinetic calculation of the robot from a torque outputted to the reduction gear by the motor, and in case that the detected value of the external force is greater than a predetermined threshold, it is judged that an arm has received the external force. Further, in this collision detecting method, in case that a command acceleration for the robot operation is greater than a predetermined value, the threshold in detection of collision is increased thereby to lower collision detecting sensibility.

Further, in the robot collision detecting method of the invention, in case that the command acceleration for the robot operation is greater than the predetermined value, the threshold in detection of collision is increased and its value is held for the predetermined time.

As described above, in the robot collision detecting method of the invention, it is possible to prevent the erroneous detection of collision when the dynamic frequency of the robot comes closer to the resonance frequency of the spring component of the reduction gear (for example, in the pull-up operation of the welding torch) without lowering the collision detecting sensibility when the dynamic frequency of the robot is low (for example, in the usual operation time).

Further, in case that the command acceleration for the robot operation is greater than the predetermined value, the threshold in detection of the collision is increased and its value is held for the predetermined time, whereby it is possible to prevent the erroneous detection of collision caused by delay in phase due to vibration of the spring component of the reduction gear and by the continuous vibration.

An embodiment of detection of robot collision will be described below.

Figure 13:
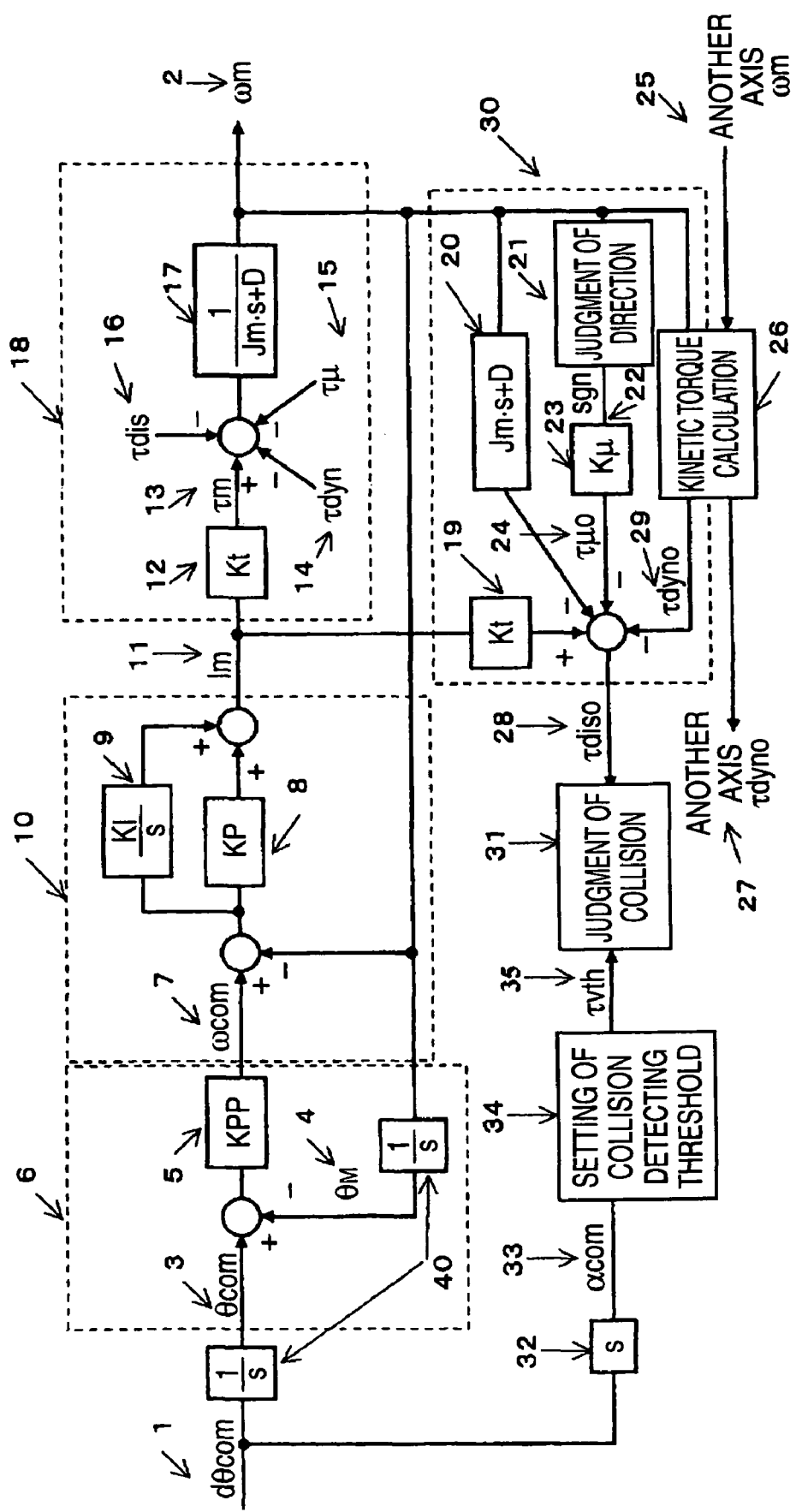
FIG. 13 is a block diagram showing a collision detecting method in an embodiment of the invention.

FIG. 13 is a block diagram showing a method of detecting robot collision in the embodiment, in which a collision detecting threshold set block 34 is added, based on the kinetic calculation method shown in FIG. 14. In FIG. 13, parts similar to those in FIG. 14 are denoted by the same reference numerals and their detailed description is omitted.

In FIG. 13, an acceleration component $\alpha com$ 33 of a position command obtained by differentiating a velocity component $d\theta com$ 1 of a position command is input to the collision detecting threshold set block 34, the acceleration component $\alpha com$ 33 is compared with the predetermined acceleration threshold $\alpha th$, and a collision detecting threshold $\tau vth$ 35 is found in accordance with the following Numerical Expression 11 and outputted to a collision judging block 31.

$$\tau vth = \begin{cases} \tau th + d\tau th & (when |\alpha com| > ath) \\ \tau th & (when |\alpha com| \le ath) \end{cases}$$ [Numerical Expression 11]

wherein $\tau th$ is a collision detecting threshold adjusted in a usual operation, and $d\tau th$ is an increase of the threshold corresponding to spring vibration of the reduction gear.

Figure 20:
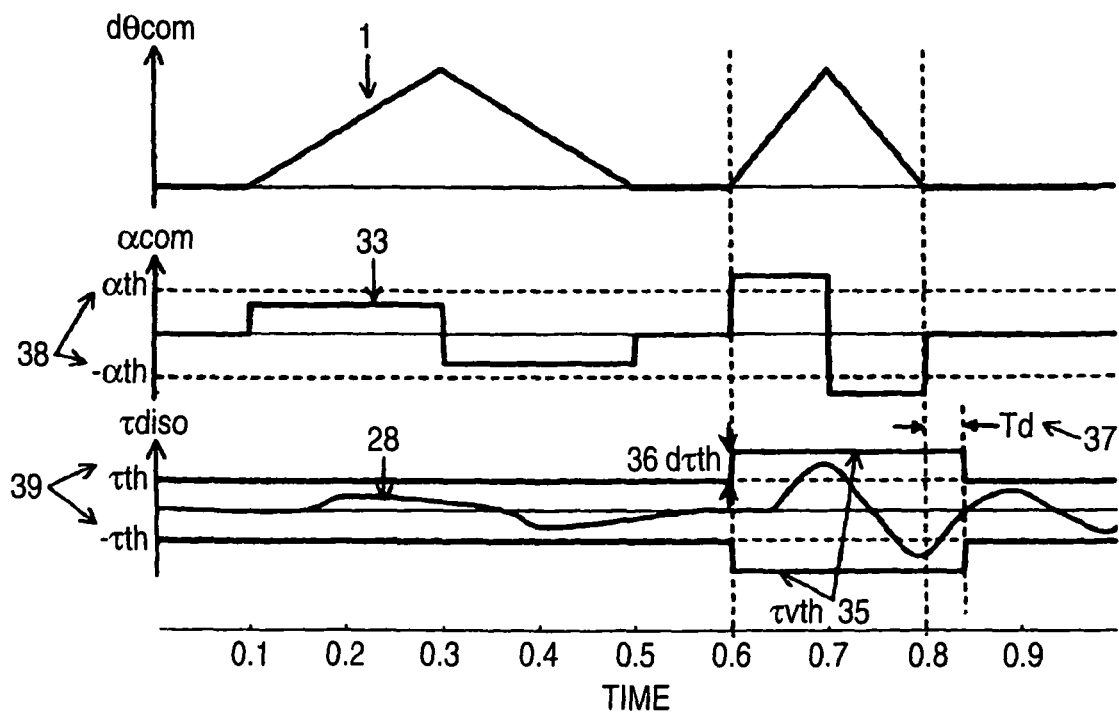
FIG. 20 is a waveform chart showing the collision judgment in an embodiment of the invention.

Further, the above $\tau th$ is previously found on the basis of the usual operation executed actually, and the $d\tau th$ is previously found on the basis of the unusual operation executed actually. 5 FIG. 20 shows a waveform when the collision judgment has been performed in a collision judging block 31 by means of this collision detecting threshold $\tau vth$ 35. In FIG. 20, as an example of the unusual operation, a welding torch pulling-up operation by a robot is shown.

As shown in FIG. 20, for a period of the time 0.6 to the time 0.8 when the torch pull-up operation is being performed, the absolute value of the acceleration component $\alpha com$ 33 of the position command exceeds a predetermined acceleration threshold $\alpha th$ 38. Therefore, for this period, as shown by the Numerical Expression 11, the collision detecting threshold $\tau vth$ 35 becomes greater by $d\tau th$ 36 than the collision detecting threshold $\tau th$ adjusted in the usual operation. Hereby, even in case that the vibration error of the reduction gear spring is added to the collision torque estimation value $\tau diso$ 28 in the period of the time 0.6 to the time 0.8, its absolute value does not exceed the collision detecting threshold $\tau vth$ 35. Therefore, the erroneous detection of collision is not generated.

Further, after the time 0.8, the absolute value of the acceleration component $\alpha com$ 33 of the position command comes to the predetermined acceleration threshold $\alpha th$ 38 or less. Therefore, the collision detecting threshold $\tau vth$ 35 returns to the collision detecting threshold $\tau th$ adjusted in the usual operation, whereby the collision detecting sensibility in the usual operation time does not lower.

The judgment of the above threshold and the change of the same are performed by, for example, a program stored in CPU (Central Processing Unit) included in a robot system.

Figure 21:
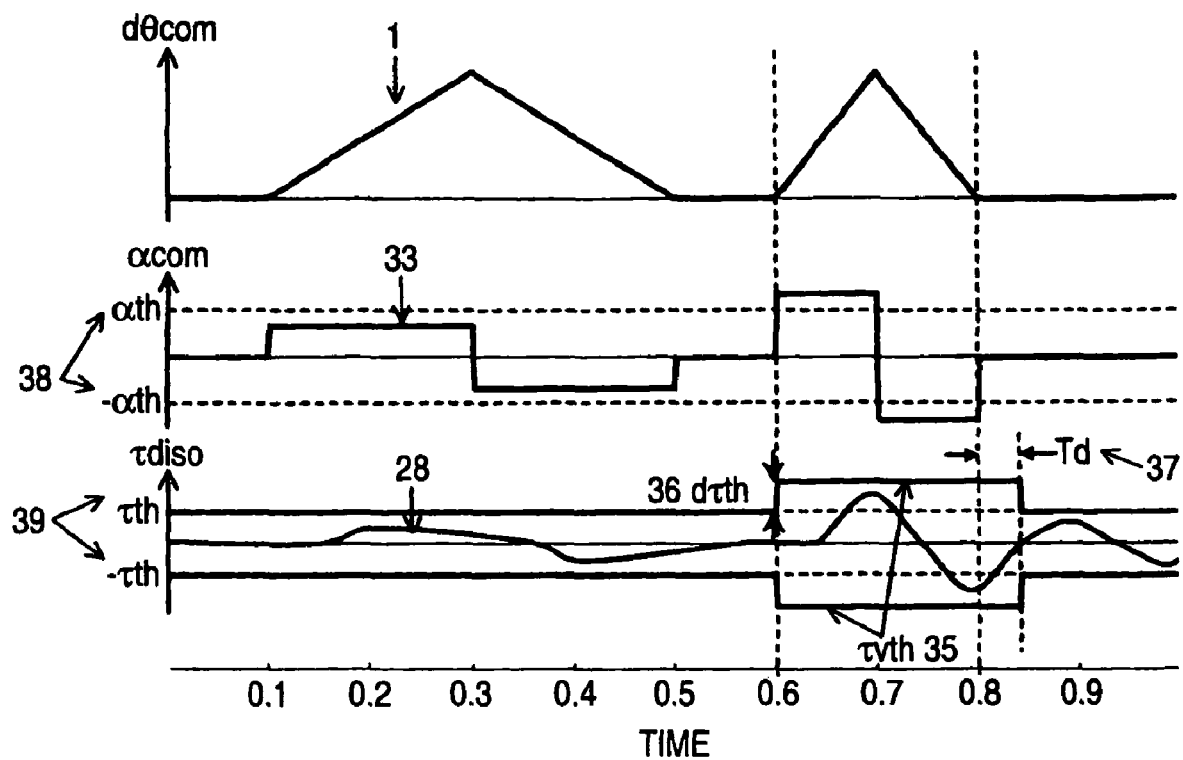
FIG. 21 is a waveform chart showing the collision judgment in an embodiment of the invention.

In the above description, the example in which the collision detecting threshold $\tau vth$ 35 is returned to the collision detecting threshold $\tau th$ adjusted in the usual operation immediately when the absolute value of the acceleration component $\alpha com$ 33 of the position command comes to predetermined acceleration threshold $\alpha th$ 38 or less has been indicated. However, immediately when the absolute value of the acceleration component $\alpha com$ 33 of the position command comes to predetermined acceleration threshold $\alpha th$ 38 or less, the collision detecting threshold $\tau vth$ 35 is not returned to the collision detecting threshold $\tau th$ adjusted in the usual operation, but the collision detecting threshold $\tau vth$ 35 may be kept $\tau th+d\tau th$ for the predetermined time Td 37 as shown in FIG. 21.

This example will be described with reference to FIG. 21. In FIG. 21, for a period of the time 0.6 to the time 0.8 when the torch pull-up operation is being performed, the absolute value of the acceleration component $\tau com$ 33 of the position command exceeds the predetermined acceleration threshold $\alpha th$ 38. Therefore, for this period, the collision detecting threshold $\tau vth$ 35 becomes greater by $d\tau th$ 36 than that in the usual case as shown in the Numerical Expression 6. When the absolute value of the acceleration component $\alpha com$ 33 of the position command becomes higher than the predetermined acceleration threshold $\alpha th$ 38 once, and next becomes lower (at the time 0.8 in FIG. 21), the collision detecting threshold $\tau vth$ 35 is kept $\tau th+d\tau th$ for the predetermined time Td 37.

Thus, even in case that the absolute value of the acceleration component $\alpha com$ 33 of the position command exceeds the predetermined acceleration threshold $\alpha th$ 38 and thereafter becomes lower than the acceleration threshold $\alpha th$ 38, the value of the collision detecting threshold $\tau vth$ 35 is not returned to the collision detecting threshold $\tau th$ immediately, but is kept $\tau th+d\tau th$ for the predetermined time Td 37. Hereby, it is possible to prevent the erroneous detection of collision even in case that delay in phase by the vibration due to the spring component of the reduction gear and the continuous vibration are produced.

Further, the processing of keeping the value of the collision detecting threshold $\tau vth$ at 35$\tau th+d\tau th$ for the predetermined time Td 37 is performed by, for example, a program stored in CPU (Central Processing Unit) provided in the robot system.

Further, the embodiment has been described on the basis on the kinetic calculation method. However, the method in the embodiment can be applied also to the disturbance estimating observer shown in FIG. 18

As described above, in case that the welding torch pulling-up operation that is larger than the usual operation in acceleration component is performed, the collision detecting threshold is made greater than the threshold adjusted in the usual operation, whereby the erroneous detection of collision can be prevented. Further, in case that the acceleration component has returned to the state in the usual operation, the collision detecting threshold is returned to the collision detecting threshold adjusted in the usual operation, whereby the collision is detected without lowering the collision detecting sensibility in the usual operation time.

Although the invention has been described particularly with reference to the specified embodiments, it will be obvious to those skilled in the art that various changes and modifications can be made in the invention without departing from the spirit and the scope of the invention.

This application has been filed on the basis of Japanese Patent Application No. 2004-306672 filed on Oct. 21, 2004 and Japanese Patent Application No. 2004-206673 filed on Oct. 21, 2004, which are taken in here for reference.

INDUSTRIAL APPLICABILITY

The consumable electrode type welding process of the invention can reduce the useless time in arc generation sequence which the conventional consumable electrode type welding process has included, thereby to reduce the tact time, prevent the wire buckling at the weld starting end portion and the generation of spatter, and reduce effectively the stop of the production line due to poor arc start. Therefore, the consumable electrode type welding process of the invention is industrially useful as a consumable electrode type welding process applied to, for example, production equipments and the use of construction.

Further, by adopting the before-described method of detecting robot collision, without lowering the collision detecting sensibility when the dynamic frequency of the robot is low, it is possible to prevent the erroneous detection of collision when the dynamic frequency of the robot comes close to the resonance frequency of the reduction gear spring component. Therefore, also under the condition where the responsibility is required even if the vibration is generated a little and the locus accuracy deteriorates a little, for example, in the torch pull-up operation in the arc start time in welding use, or in the weaving operation of vibrating the torch, it is possible to prevent the erroneous detection of collision.

The invention claimed is:

1. A welding system including:
a wire feeding unit which feeds a welding wire to a welding torch;
an actuator which holds the welding torch and moves the welding torch;
a controller which has a position control system and drive-controls the actuator; and
a welding power supply unit which applies weld output between a workpiece and the welding wire, wherein the welding torch is moved by the actuator in a direction separating from the workpiece thereby to control the velocity of the welding wire for the workpiece; and
the controller includes, separately from the position control system, a dedicated separation control system which moves the actuator only in the direction where the welding torch is separated from the workpiece; and
the dedicated separation control system is always connected to the position control system, and the controller outputs a velocity command relating to a welding torch pull-up operation to the dedicated separation control system and outputs a velocity command relating to an operation other than the welding torch pull-up operation to the position control system without the dedicated separation control system.

2. The welding system according to claim 1, wherein the dedicated separation control system performs feedforward control.

3. The welding system according to claim 2, wherein respective gains of the velocity command relating to the welding torch pull-up operation and the velocity command relating to the operation other than the welding torch pull-up operation are separately changed to perform the feed-forward control.

4. A method of preventing erroneous collision detection within a multi-articulated robot driven through a reduction gear by a motor utilizing the welding system according to claim 1, comprising the steps of:

sensor-less detecting external force due to collision by subtracting a kinetic torque obtained by an inverse kinetic calculation of a robot from a torque outputted to the reduction gear by the motor;
judging that an arm has received the external force in case that the detected value of the external force is greater than a predetermined threshold; and
increasing the threshold for detection of collision to lower collision detecting sensibility in case that a command acceleration of the robot operation is greater than a predetermined value.

5. The welding system according to claim 4, wherein the threshold for detection of collision is increased, and this state where the threshold is increased is kept for the predetermined time in case that the command acceleration of the robot operation is greater than the predetermined value.

6. The welding system according to claim 1, wherein the welding torch is moved by the actuator in the direction separating from the workpiece while the welding is fed toward the workpiece.

7. The welding system according to claim 1, wherein the controller continues to output the velocity command relating to the welding torch pull-up operation to the dedicated separation control system until the welding torch is moved in a predetermined height after the welding wire contacts the workpiece.

8. The welding system according to claim 1, wherein the velocity command relating to the welding torch pull-up operation outputted to the dedicated separation control system is separate from a velocity command in a usual operation outputted to the position control system.

9. The welding system according to claim 1, wherein the controller controls an operation direction of the welding torch to be only the direction separating the welding torch from the workpiece.

10. A consumable electrode type welding method, which, by means of a welding system including a wire feeding unit which supplies a welding wire to a welding torch, an actuator which holds the welding torch and moves the welding torch, a controller which has a position control system and drive-controls the actuator, and a welding power supply unit which applies weld output between a workpiece and the welding wire, moves the welding torch by the actuator in a direction separating from the workpiece, thereby to control the velocity of the welding wire for the workpiece, in that the controller includes, separately from the position control system, a dedicated separation control system for moving the actuator only in the direction where the welding torch is separated from the workpiece; and
the dedicated separation control system is always connected to the position control system, and a velocity command relating to a welding torch pull-up operation is outputted to the dedicated separation control system and a velocity command relating to an operation other than the welding torch pull-up operation is outputted to the position control system without the dedicated separation control system.

11. The consumable electrode type welding method according to claim 10, wherein the dedicated separation control system performs feedforward control.

12. The consumable electrode type welding method according to claim 11, wherein respective gains of the velocity command relating to the welding torch pull-up operation and the velocity command relating to the operation other than the welding torch pull-up operation are separately changed to perform the feed-forward control.

13. The consumable electrode type welding method according to claim 10, wherein a multi-articulated robot, which is driven through a reduction gear by a motor, is used to prevent erroneous collision detection, the method comprising the steps of:

sensorless detecting external force due to collision by subtracting a kinetic torque obtained by an inverse kinetic calculation of a robot from a torque outputted to the reduction gear by the motor; judging that an arm has received the external force in case that the detected value of the external force is greater than a predetermined threshold; and increasing the threshold for detection of collision to lower collision detecting sensibility in case that a command acceleration of the robot operation is greater than a predetermined value.

14. The consumable electrode welding method according to claim 10, in case that the command acceleration of the robot operation is greater than the predetermined value, the threshold for detection of collision is increased, and this state where the threshold is increased is kept for the predetermined time.

15. The consumable electrode welding method according to claim 10, wherein the welding torch is moved by the actuator in the direction separating from the workpiece while the welding is fed toward the workpiece.

16. The consumable electrode welding method according to claim 10, wherein the velocity command relating to the welding torch pull-up operation continues to be outputted to the dedicated separation control system until the welding torch is moved in a predetermined height after the welding wire contacts the workpiece.

17. The consumable electrode welding method according to claim 10, wherein the velocity command relating to the welding torch pull-up operation outputted to the dedicated separation control system is separate from a velocity command in a usual operation outputted to the position control system.

18. The consumable electrode welding method according to claim 10, wherein the controller controls an operation direction of the welding torch to be only the direction separating the welding torch from the workpiece.

* * * * *

UNITED STATES PATENT AND TRADEMARK OFFICE
CERTIFICATE OF CORRECTION

PATENT NO. : 7,842,904 B2
APPLICATION NO. : 10/582563
DATED : November 30, 2010
INVENTOR(S) : Hiroyuki Nakata et al.

It is certified that error appears in the above-identified patent and that said Letters Patent is hereby corrected as shown below:

In column 11, line 39, please add a -- . -- between the words "TV" and "Further"

In column 15, please correct the overlap when displaying Numerical Expression 8 between lines 10 and 15. The line should read:

$$\tau dis = (Kt \times Im - Jm \times \alpha m - D \times \omega m - K\mu \times sgn) - \tau dyn \qquad [\text{Numerical Expression 8}]$$

In column 19, line 39, please delete "5" and instead begin a new paragraph.

In column 20, line 18, please delete "τcom" and insert therefor -- αcom --

Signed and Sealed this
Fifteenth Day of March, 2011

David J. Kappos
*Director of the United States Patent and Trademark Office*